United States Patent [19]
Borchardt

[11] Patent Number: 5,308,666
[45] Date of Patent: May 3, 1994

[54] WRITE-ON FILM SURFACE AND BAGS HAVING A WRITE-ON STRIPE

[75] Inventor: Michael G. Borchardt, Lisle, Ill.

[73] Assignee: First Brands Corporation, Danbury, Conn.

[21] Appl. No.: 965,990

[22] Filed: Oct. 16, 1992

Related U.S. Application Data

[63] Continuation of Ser. No. 446,825, Dec. 6, 1989, abandoned.

[51] Int. Cl.$^5$ .............................. B32B 3/26; B32B 7/02
[52] U.S. Cl. ................................... 428/35.2; 428/35.5; 428/36.4; 428/206; 428/216; 428/516; 428/518; 383/116
[58] Field of Search .................. 428/206, 516, 35.2, 428/35.5, 518, 156, 36.4, 216; 383/116

[56] References Cited

U.S. PATENT DOCUMENTS

| | | | |
|---|---|---|---|
| 4,486,552 | 12/1984 | Niemann | 523/169 |
| 4,716,068 | 12/1987 | Seifried et al. | 428/516 |
| 4,801,487 | 1/1989 | Kalus et al. | 428/206 |
| 4,876,156 | 10/1989 | Hwo | 428/516 |
| 4,925,711 | 5/1990 | Akao et al. | 428/35.2 |
| 4,960,637 | 10/1990 | Biczenczuk | 428/314.4 |

*Primary Examiner*—Ellis P. Robinson
*Assistant Examiner*—Rena L. Dye
*Attorney, Agent, or Firm*—Gary L. Wamer

[57] ABSTRACT

The invention relates to a write-on surface derived by surface treatment (corona-discharge or other similar surface treatment) of a novel write-on composition. The write-on composition to be treated is characterized as a physical mixture of two substantially incompatible polymers and, optionally, a particulate material.

17 Claims, 19 Drawing Sheets

WRITE-ON FILM SURFACE AND BAGS HAVING A WRITE-ON STRIPE

This application is a continuation of prior U.S. application Ser. No. 446,825, filed Dec. 6, 1989, now abandoned.

CROSS REFERENCE TO RELATED APPLICATION

This application is related to copending U.S. patent application Ser. No. 07/446,966 entitled, "WRITE-ON FILM AND BAGS HAVING A WRITE-ON STRIPE" filed on even date herewith.

FIELD OF THE INVENTION

The instant invention relates to writable or write-on plastic surfaces and to novel write-on compositions for use in providing a write-on surface on a bag body. In one embodiment the invention relates to a writable plastic film surface provided as a write-on area for a plastic bag whereby the user of the bag may conveniently write on the outer bag surface to provide easily viewable information concerning the contents or use of the bag.

BACKGROUND OF THE INVENTION

The prior art relating to the preparation of write-on plastic surfaces is replete with numerous examples of diverse methods of physically or chemically treating a plastic surface to improve the ability of the plastic surface to accept ink from a pen or, alternatively, a printing ink (collectively and generally referred to in the prior art and herein as "ink"). The ability of an ink to be retained or adhere to a surface is commonly referred to as the "wetting" characteristic of the ink for that surface and reflects the extent of adhesion of the ink to the particular surface. This ability of the ink to wet the surface is also an indication of the writability of surface. Review of the prior art relating to write on thermoplastic surfaces is set forth hereinafter.

The prior art has disclosed both chemical and physical treatment processes for modification of the surface characteristics of thermoplastic materials. For example, U.S. Pat. No. 4,024,038 discloses chemical treatment of a plastic surface with a modification agent, e.g., a solvent, for the purpose of improving the adhesion characteristics of the surface of the plastic. Since chemical treatment is costly and difficult to implement in commercial manufacturing processes, the most commonly employed means for modifying, i.e. "treating", a plastic surface to improve its adhesion characteristics is the use of corona-discharge treatment. The use of corona-discharge for treating the surface of a plastic to improve the ability of an ink to adhere to the plastic surface, i.e., to improve the adhesion characteristics of the film, is well established in the prior art, as represented by the disclosures of U.S Pat. Nos.: 2,810,933; 2,844,731; 4,051,044; and 4,710,358. Use of corona-discharge treatment has typically addressed the treating conditions and not the compositional make-up of the plastic material being treated.

In addition to the patent literature, there is a significant body of non-patent, technical literature on corona-discharge treatment of plastic films. For example, the article "corona-discharge Treatment of Polyethylene Films I, Experimental Work and Physical Effects", *Polymer engineering and Science,* Vol. 18. No. 4 (March 1978) discusses the adhesion characteristics of corona-discharge treated polyethylene films and describes several testing procedures found useful in testing polyethylene films. Interestingly, the corona-discharge treated films tested by the article's author were limited to unmodified polyethylene films ("barefoot resins") and polyethylene films containing only low to medium concentrations of the slip additive commonly employed in the manufacture of polyethylene films. The article reported some interesting results. The presence of slip additive in the polyethylene film was noted to decrease the adhesion properties of the corona-discharge treated film, i.e., the treated film demonstrated reduced adhesion characteristics. Significantly higher corona-discharge treatments were required to increase the surface adhesion properties. Further, the article reported that the addition of slip additives drastically changed both the polar characteristics and dispersion characteristics of the film's surface energy. The article noted that corona-discharge treatment of the slip additive (commonly referred to as "slip agents") associated with the polyethylene films did not result in an improvement in the "Wipe" test or "Adhesion" test employed in the article for evaluating the surface adhesion characteristics of the films. These tests are commonly employed to evaluate the writability/printability of a corona-discharge treated film surface as a function of the surface adhesive properties of the film surface (often referred to as the "wetting" characteristics of the film surface by an ink).

Wetting characteristics of polyethylene films and the ability of such surfaces to have an ink adhere thereto have been discussed in the article entitled, "SURFACE CHARACTERIZATION OF CORONA TREATED POLYETHYLENE FILMS", *ANTEC* 85, pages 269–272 (1985). This article examined the printability of polyethylene film and the effect of corona-discharge surface treatment on the polyethylene film surface to improve ink wetting of the film surface, i.e., surface adhesion properties. The results reported by this article are interesting in many respects. The author reported that, "Surface roughness is a barrier to wetting and yields higher than expected [contact] angles" for unmodified low density polyethylene films ("barefoot resins"), i.e. a polyethylene film not containing slip or other processing additives. As expected, the author reported a clear relationship between the surface oxidation resulting from corona-discharge treatment and surface wetting of the evaluated barefoot polyethylene resins.

In another recent article entitled, "The Whole Story: Wettability, Corona Treaters and Compliance" CONVERTING MAGAZINE, September, (1986), the use of corona-discharge treaters is discussed in relation to in-line printing presses. The article is interesting in both its discussion of the effect of slip additives and use of water-based printing inks. The presence of slip additives on the surface of a modified film, i.e., slip additive-containing film, and the problems slip additives create in printing on the film surface are discussed. The author (Collins) reported interesting observations on the relationship of slip additives and the effect of corona-discharge treatment on slip additive-containing film. Several phenomena relating to the slip additives are discussed in the article, wherein Collins stated:

"It was observed that slip additives have a relatively low melt temperature. This means that subjecting the slip to excessive power levels would cause the slip additive to melt and become mobile, thereby obliterating the results of the treatment.

Corona treatment is strictly a surface phenomenon, he explained, with depth of penetration measured in angstroms. Whereas the surface slip additives can be successfully treated, subsequent movement through melting can cause the effect to be lost. Melt temperature of the slip, according to Pillar tests, appears to be in the neighborhood of 180° F."

After acknowledging the aforementioned phenomena the author discussed various alternatives to consider to resolve the problems encountered with slip additive-containing films. The thrust of the ensuing discussion related to adjustment of the corona-discharge treater and the role of the electrode and carrier roll in achieving optimum treatment results. (It is noted that the content of the article demonstrates that the author did not consider modification of the film composition as a means to improve the writability of the slip-additive-containing film.)

Although the patent and non-patent literature contain numerous references to both chemical and physical treatments of a plastic surface for the purpose of improving the adhesion characteristics of a film, e.g. the adherence of an ink to the plastic surface, there has been relatively little prior art discussion on the importance of the chemical composition of the plastic material being treated. Two patents discussing the composition of the plastic material as a means for affecting the adhesion characteristics of a plastic surface are discussed hereinafter.

An early reference to a plastic drawing material sheet is found in British Patent Specification No. 1,478,474. This British Patent discloses a plastic sheet material having a drawing layer which contains a crosslinked thermoplastic film-forming binder comprising more than 50% by weight of a polyvinyl butyral crosslinked by means of an etherified (polymethyl)-melamine in the presence of an acid catalyst, which polyvinyl butyral contained at least 18 per cent by weight of vinyl alcohol groups before crosslinking. The British patent discloses the drawing layers as suitable for use with graphite pencils and ink. In addition, the drawing layers can contain "toothing agents" selected from a wide range of particulate materials, including diatomaceous earth, glass powder, titanium dioxide, zinc oxide, kaolin and amorphous silica. The function of the "toothing agents" is somewhat unclear from the British patent, although the patentee states that a mixture of two toothing agents having different particle size and specific surface may be provided to improve the erasability of the drawing layer. One would assume that an improvement in erasability corresponds to a decrease in surface adhesion or a decrease in surface writability.

U.S. Pat. No. 4,801,487 discloses an imprintable sheet of a plastic comprising a carrier sheet and a coating layer applied on at least one layer of the carrier sheet for receiving an imprint. The coating layer to be imprinted consists of a firm polymer matrix and microporous finely divided solid particles. The patentee describes the non-imprintable carrier sheet as a non-polar polymer such as polyethylene or polypropylene. The firm polymer matrix of the coating layer is disclosed at column 3, lines 30-39 as consisting substantially of several polymers. These polymers are contrasted by the patentee with the polyethylene and polypropylene polymers employed for forming the non-imprintable carrier sheet. For example, the firm polymer matrix (the coating layer to be imprinted) may be selected from a large class of polymers, including polyacrylates, polymethacrylates, polyesters, polystyrenes, poly-1-3-dienes, polyamides, polyurethanes, polyvinyl butyral, polyvinyl acetate alkyde resins, urea resins and resins modified with natural materials such as starch and casein. The "microporous finely divided solid particles" are disclosed as absorbent solid particles and are discussed at column 3, lines 40-60. The extensive list of absorbent solid particles covers a wide range of solid materials having widely different chemical and physical properties, including white pigments and white or colorless fillers, such as aluminum oxide, barium sulfate, titanium dioxide, silicic acid, silicates, chalks, starch, melamine resins and/or formaldehyde resins. The function of the microporous finely divided solid particles cannot be surmised from this diverse random listing of materials. In fact, the patentee points out that the relevant criteria in selecting the microporous finely divided solid particles are that the particles be finely divided (having large specific surface area) and have a microporous internal structure. (See: column 3, lines 50-53) The specification and examples refer to the application of the firm polymer matrix as being a "coating" applied on the non-imprintable carrier sheet. The patentee actually refers to the firm polymer matrix coating as a "liquid primer". It is clear that the patentee's imprintable coating layer is related only to the firm polymer matrix with the microporous finely divided solid particles wherein the coating is applied as a liquid primer coating to a non-imprintable carrier sheet, e.g., a polyethylene or polypropylene film. The patentee discloses a corona-discharge treatment of the carrier sheet before the primer liquid is applied. It is clear that the corona-discharge treated carrier sheet is not considered to be a write-on surface, (i.e., the coating provides this function) but is merely treated to improve adhesion of the liquid primer to the carrier sheet.

The addition of calcium carbonate additives for polyolefin films has been reported in the prior art. For example, the use of OMYACARB® (OMYACARB® $CaCO_3$ is sold by OMYA, 61 Main Street, Proctor, Vt. 05765) calcium carbonate mineral additive as a mineral additive in polyolefin films has been disclosed by the manufacturer to reduce the corona-discharge treatment levels by over 50 percent. Further, in sales literature on OMYACARB ® calcium carbonate mineral additive, it is noted that "Early studies also indicate that the decay of Corona Treatment over time is minimized by the inclusion of a calcium carbonate mineral additive. It is believed that the microroughening effect on the film surface that is imparted by these mineral additives allows the reduction in Corona level and the blockage of decay. It is important to note also that this micro-roughening effect enhances film printability."

The above discussion is instructive in demonstrating that the prior art to date has not appreciated the complexity of the problems associated with write-on plastic surfaces as such relate to compositional changes in the formulation of the plastic material. These problems (such problems not heretofore appreciated by the prior art) are further complicated when the user is attempting to write on a plastic film surface manufactured in conjunction with a commercial bag manufacturing process. It has been observed herein that additional problems arise in commercial bag manufacturing processes owing to the numerous and variable manufacturing parameters of these processes. For example, it is common practice to employ a number of chemical processing aids to assist in commercial manufacturing processes for bags and film products. Such additives are typically provided as a "masterbatch" to the plastic material being processed. For example, a common additive in the masterbatch is a slip additive (commonly called a "slip agent"). The slip agent is added to improve machine handling of the plastic material, e.g., a plastic film, by increasing the slipperiness of the surface of the plastic so as to facilitate its ease of passage through the manufacturing equipment. The very slipperiness that is beneficial in the manufacture of the plastic material has been found to be detrimental to the end user's ability to write on the plastic film surface. The deterioration in the printability of the film as a result of film additives and/or oligomers is addressed in U.S. Pat. No. 4,832,772 wherein a physical surface "wiping" step in employed and is preferably employed with a preparatory solvent treatment of the surface. U.S. Pat. No. 4,832,772 discloses a process for wiping off a weak lay on the film surface containing oligomers and additives, although, surprisingly, no discussion of the nature of the "additives" is provided by the patentee.

As aforementioned, the use of a corona-discharge treatment of a plastic surface has been generally found to improve the writability or printability of slip agent-containing plastic materials by oxidizing the film surface and, if slip agent is present, "burning-off" a portion of the slip agent on the film surface. A discussion of the effect of corona-discharge treatment is set forth in the recent article by James F. Carley and P. Thomas Kitze, entitled, "Corona-Discharge Treatment of Polyethylene Films. I. Experimental Work and Physical Effects", POLYMER ENGINEERING AND SCIENCE, Vol. 18, No. 4 (March, 1978). The article is instructive in its disclosure that no changes in surface topography as a result of commercial corona-discharges are believed to contribute to practical adhesion phenomena and, further, that very high corona-discharge treatment was required to affect slip additives at the surface of polyethylene.

It has been found herein in accordance with the instant invention that this "burning off" effect and the associated improvement in surface adhesion characteristics is a short-lived surface effect when slip agent is present in the plastic composition or in close proximity to the plastic composition. This observation stems from the fact that corona-discharge is a surface treatment. The slip agent present in the bulk plastic composition is not affected by the corona-discharge treatment. It has been observed that this "bulk" slip agent in the plastic composition migrates to the corona-discharge treated surface as time passes, i.e., as the film ages, and the amount of slip agent at the surface increases with time. This "aging phenomenon" is related to the time the film has aged as well as the ambient conditions, e.g., temperature, under which the film has aged. Further, during many manufacturing processes, e.g., during the manufacturing of plastic bags and plastic films, the plastic bags and plastic films are stacked or placed on a roll in such a manner that film surface treated by corona-discharge contacts an untreated film surface having a greater amount of slip agent on the film surface that is present on the corona-discharge treated film surface. Once again, the net result of this contacting is an increase in amount of slip agent on the corona-discharge treated film surface as a result of the physical contacting of the two film surfaces.

The prior art has not appreciated and, accordingly, has not addressed the aforementioned problems associated with write-on plastic surfaces. Further, the unique problems associated with write-on surfaces associated with plastic bags has not been appreciated as to the unique problems associated with bag surfaces in physical contact with slip agents. As a result of this lack of appreciation, the prior art has not proposed effective means by which the write-on characteristics of plastic surfaces may be improved other than by simple mechanical or chemical surface treatment which are not effective for plastic surfaces that have undergone aging in the presence of slip agents.

The instant invention addresses these problems by providing a write-on composition suitable for corona-discharge (or other surface treatment providing a similar surface treating effect) having improved resistance to slip agent interference with the writability of the write-on film surface. Further, the instant invention addresses the unique problems associated with the commercial manufacture of plastic bags having a bag body formed from a plastic film containing at least one slip agent component and having at least one write-on surface on at least one wall of the bag body.

SUMMARY OF THE INVENTION

The instant invention relates to a writable plastic surface (preferably a plastic film surface) formed by corona-discharge treatment (or other similar surface modification treatment) of a novel write-on composition. The write-on composition to be treated is characterized as comprising: a) a physical mixture of two polymers, as described in detail hereinafter; and, optionally, but preferably, b) particulate material present in an effective amount to further improve the writability of the corona-discharge treated plastic surface.

In one embodiment the write-on surface comprises a corona-discharge treated write-on film composition wherein the write-on film composition, preferably sans slip agent, is coextruded with a bag film containing a slip agent, preferably a polyethylene film. A particulate material may be present in an effective amount in the write-on composition to aid in a reduction in the detrimental effect of slip agent on the writability of the corona-discharge treated writable film surface. The write-on film surface may also be beneficially provided with an embossed pattern.

In a further embodiment the write-on composition to be corona-discharge or surface treated is formed as a film which is substantially sans slip agent, i.e., formed substantially in the absence of slip agent or contains no slip agent additive. In this embodiment the write-on composition may be associated with a bag body and formed as a layer in a co-extruded slip agent-containing bag film.

In a further embodiment the write-on composition comprises a major amount of polyolefin resin, e.g., polypropylene, high density polyethylene and/or low density polyethylene, as the first polymer and a minor amount of a polyisobutylene polymer as the second polymer, as hereinafter discussed.

In a further embodiment the invention relates to a bag having a write-on surface and to a stack of bags with a write-on surface.

DETAILED DESCRIPTION OF THE INVENTION

Figure 1:
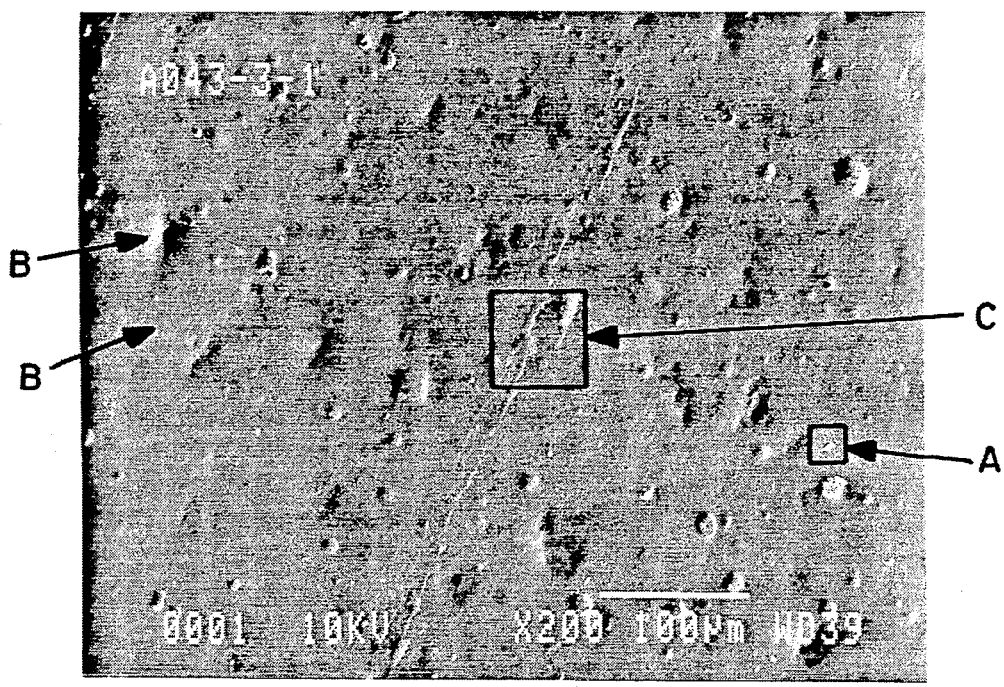
FIG. 1 is a 200× photomicrograph illustrating a film surface not of the instant invention showing a non-wetting surface when the film surface is not corona-discharge treated.

In its broadest sense the invention relates to a writable plastic surface suitable for use as a write-on or an imprintable surface. The ability of a plastic surface to accept an ink, e.g., from an ink pen or an ink printing process, is generally referred to herein as the "writability" or the "write-on" characteristic of the plastic surface and reference to a "write-on" surface herein includes the application of ink to a surface by use of a ballpoint pen, a printing process or other means known in the prior art. The instant invention relates to a writable plastic surface derived by corona-discharge treatment (or other similar physical or chemical surface treatment) of a write-on composition. The write-on composition to be treated is generally characterized as:
a) a physical mixture of two substantially incompatible polymers; and, optionally, b) a particulate material present in an effective amount to improve the writability of the corona-discharge treated film surface. The use of so called "corona-discharge treaters" to treat plastic surfaces is well known, as evidenced by articles such as "The whole story: wettability, corona treaters and compliance", CONVERTING MAGAZINE, September 1986, the aforementioned article incorporated herein by reference.

In one embodiment the write-on composition may contain a slip agent and is formed into a film but is preferably sans slip agent. The film surface is corona-discharge treated to provide a write-on film surface having improved writability upon aging.

In a further embodiment a write-on film is coextruded with a polyolefin film, e.g., a polyethylene film, containing a slip agent and the write-on composition is provided as a write-on surface sans, i.e., without, slip agent. Further, a particulate material may be present in an effective amount to interfere with the negative affect that migrating slip agent has on the writable film surface as the film ages. As discussed hereinafter the presence of slip agent in the polyolefin bag material and write-on stripe portion of a bag decreases the writability of the write-on surface, especially as the film undergoes aging after its manufacture. In a further embodiment the write-on surface is a film comprising a major amount of a mixture of low density polyethylene and high density polyethylene as a first polymer and a minor amount of a polyisobutylene as the second polymer, preferably provided as a polyisobutylene-containing material such as EXXELOR ™ PA-30 or EXXELOR ™ PA-50, as hereinafter discussed.

The invention also relates to a bag having a write-on surface, a stacked bag article comprising a plurality of bags having a write-on surface, e.g., a write-on stripe.

Although corona-discharge treatment has generally been found to be useful in improving the write-on characteristics of a plastic surface, including plastic film surfaces, it has been observed herein that corona-discharge treatment alone is not sufficient to provide an acceptable write-on surface for many end use applications. This writability problem becomes especially acute when the write-on surface of interest is provided on a bag body formed from a thermoplastic film formed with a slip additive. The presence of the slip agent has been observed to be an especially acute problem as the film ages, since slip agent has been observed to bleed to the film surface. Further, the rate of bleeding of the slip agent to the film surface has been observed to increase with increasing temperature. The write-on characteristics of a write-on area are even further complicated when the write-on area is provided as a write-on area manufactured in conjunction with heretofore commercially employed bag manufacturing processes. The unique problems associated with write-on surfaces and bag manufacturing will be discussed hereinafter in conjunction with one embodiment of the instant invention.

The write-on composition of the instant invention is generally characterized as comprising two polymers wherein the second polymer is substantially incompatible in the first polymer. The term "substantially incompatible" is used herein to denote a polymer mixture wherein at least one polymer component forms identifiable particles in the polymer mixture when the polymer mixture is extruded as a film composition. In one embodiment of the instant invention the write-on composition comprises a major amount of a low density polyethylene and a minor amount of a polyisobutylene-containing polymer blend. Two such polymer blends found to be useful in the instant invention are sold by Exxon Chemical Company, P.O. Box 3272, Houston, Tex., 77253-3272, under the product trade designations EXXELOR ™ PA-30 and EXXELOR ™ PA-50. EXXELOR ™ PA-30 is a pelletized polyisobutylene alloy and modifier comprising a blend of polyisobutylene and polypropylene in a weight ratio of about 1 to 2, respectively. Typical properties of EXXELOR ™ PA-30 are as follows:

| EXXELOR ™ PA-30 | | |
|---|---|---|
| Property | Value | ASTM Method |
| Melt Index (190° C.), g/10 min | 0.15 | D1238 (Condition E) |
| Melt Flow Rate (230° C.), g/10 min | 0.50 | D1238 (Condition L) |
| Density, g/cc | 0.91 | D1505 |
| Vicat Softening Point (200 g), °F. | 310 | D1525 |
| Hardness (5 sec, Shore A) | 85 | D2240 |
| Flexural Modulus, psi | 6,150 | D790 |

EXXELOR ™ PA-50 is a pelletized elastomeric concentrate comprising a blend of a polyisobutylene and a high density polyethylene in a weight ratio of about 1 to 2, respectively. Typical properties EXXELOR ™ PA-50 are as follows:

| EXXELOR ™ PA-50 | | |
|---|---|---|
| Property | Value | ASTM Method |
| Melt Index (190° C.), g/10 min | 0.23 | D1238 (Condition E) |
| Melt Flow Rate (230° C.), g/10 min | 0.65 | D1238 (Condition L) |
| Density, g/cc | 0.924 | D1505 |
| Vicat Softening Point (200 g), °F. | 253 | D1525 |
| Hardness (5 sec, Shore A) | 78 | D2240 |
| Flexural Modulus, psi | 6000 | D790 |

The first polymer of the write-on composition is typically a polyolefin, e.g., polyethylene, polymer (including ultra-low density, low density, medium density and high density) owing to their low cost but may be other polymeric materials heretofore known in the art. The first polymer may be selected from a wide range of polymers including polyethylenes, polypropylene, polybutylenes, butadiene/styrene, polyvinyl alcohol and the like. Further, the first polymer may comprise a homogeneous blend of one or more polyethylene polymers and one or more other polymers, e.g., it has been observed that a first polymer comprising a mixture of low density polyethylene and a polyvinyl alcohol or a butadiene/styrene polymer may be useful as the first polymer in the two polymer mixture of the write-on composition. The use of a polyvinyl alcohol or butadiene/styrene as a component in a mixture with polyethylene is believed to sequester the migration of slip agent, although the r echanism of the interaction of the slip agent and the polyvinyl alcohol or butadiene/styrene is not understood at present.

The second polymer is preferably a polyisobutylene polymer (including physical mixtures of polyisobutylene with polypropylene, the various polyethylenes and the like) when the first polymer is a polyolefin, although other substantially incompatable polymers may be employed. As aforementioned, the operative parameter is selecting the first and second polymers is the substantial incompatibility of the second polymer in the first polymer, as herein described.

The write-on composition may also contain a particulate material to improve write-on characteristics, especially when the write-on film undergoes aging. The particulate material is present in an effective amount to reduce interference of the slip agent at the write-on surface as compared to the writability that would be observed if the particulate material were not present in an effective amount. The role of the particulate material in the improvement of the writability of the write-on surface is believed to result from several factors. Although not wishing to be bound by any theory, it is believed that when properly selected the particulate material will provide two distinct functions. First, the particulate material may interact with the slip agent to inhibit its migration i.e., bleeding, to the write-on surface. Second, the particulate material may act as a roughing agent for the write-on surface. This roughening effect may provide several advantages peculiar to the adherence of ink to the surface by use of an ink pen as opposed to printing on the surface. Since the slip agent may collect in small pits formed by several particles of the particulate material, the slip agent may be below the surface of the write-on surface over which the ink is contacted and, accordingly, does not interfere with the writability of the write-on surface. Further, the "roughness" characteristic of the particulate material is also believed to be beneficial when the write-on surface is written upon with a ballpoint pen, since the roughness of the surface is believed to beneficially aid in the mechanical rolling of the ballpoint pen as it moves across the write-on surface. Further, the use of a particulate solid, such as calcium carbonate, may act as a cleaning agent for the ball point of the pen to assist in dislodging slip agent picked up by the pen during writing. It has been observed that not all particulate materials are useful, since use of talc was not observed to provide a beneficial improvement in the writability of the write-on surface.

The selection of the first polymer and second polymer is related to the substantial incompatibility of the second polymer in the first polymer. The first polymer and second polymer are selected such that identifiable particles of the second polymer are present in the first polymer. FIGS. 1 to 36 in the instant application demonstrate the identification of the second polymer particles by use of an electron scanning microscope. Although the relative amount of the first polymer and the second polymer will be related to the aforementioned substantial incompatibility, the first polymer will typically be present in a major amount (i.e., over fifty percent (50%) by weight) of the write-on composition. The second polymer will typically be present in a minor amount (i.e., less than fifty percent (50%) by weight) of the total write-on composition.

It has been found that when the first polymer is a low density polyethylene having a density between about 0.915 to 0.940 (of the type commonly employed in the manufacture of thermoplastic bags and film) and/or polypropylene and the second polymer is a polyisobutylene-containing material such as EXXELOR TM PA-30 or EXXELOR TM PA-50, that the aforementioned "substantially incompatible" criteria are met. In one embodiment a low density polyethylene (formed with a 1-butene, 1-hexene or 1-octene comonomer) having a density of between about 0.915 and about 0.940 g/cm$^3$, preferably between about 0.915 and about 0.930 g/cm$^3$ (typically having a melt index of between about 0.6 to 1.2) is employed at between about 50 wt. % and about 95 wt. % of the write-on film composition and a polyisobutylene/polypropylene mixture (sold under the Trademark EXXELOR TM PA-30 by EXXON Chemicals Company) or a polyisobutylene/high density polyethylene mixture (sold under the trademark EXXELOR TM PA-50 by Exxon Chemicals Company) comprises between about 5 and about 20 weight percent of the write-on composition. The aforementioned discussions on the substantial incompatibility of the second polymer in the first polymer do not include any other polymer present in a polymer blend, unless such polymer(s) also meets the aforementioned criteria of substantial incompatibility, i.e., the first polymer and/or second polymer may themselves each comprise more than one polymer component. With respect to the use of EXXELOR TM PA-30 and EXXELOR TM PA-50 as the second polymer component it has been observed that the polypropylene and the high density polyethylene present as carrier polymers for the polyisobutylene polymer in the EXXELOR TM PA-30 and EXXELOR TM PA-50, respectively, do not meet the compatibility requirements for a second polymer when the first polymer is selected to be a low density polyethylene and, therefore, such carrier polymers should be treated as first polymer components in determining the relative weight percents of the first polymer and second polymer.

Figure 38:
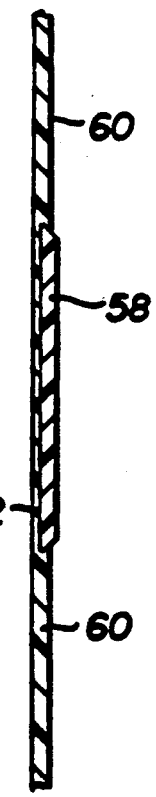
FIG. 38 is a perspective view of the sidewall of a flexible container showing a write-on stripe coextruded with a bag film.

In one embodiment a polyisobutylene-containing material is employed as a component of the write-on composition (EXXELOR TM PA-50) and is present as a minor amount of the write-on composition with the major component comprising a low density polyethylene. Since EXXELOR TM PA-50 (and EXXELOR TM PA-30) is a polymer mixture (containing about 67 weight percent polyisobutylene and 33 weight percent of a high density polyethylene), the overall weight percent of polyisobutylene polymer in the write-on composition will generally be between about 3.25 weight percent and about 13.0 weight percent polyisobutylene, based upon the total weight of the polymeric components (e.g., polyisobutylene, low density polyethylene and high density polyethylene) in the write-on composition. In general the preferred low density polyethylene material employed as the major component with the aforementioned minor component (polyisobutylene-containing material) is characterized as having a density between about 0.915 and about 0.940 g/cm$^3$, preferably between about 0.915 and about 0.930 g/cm$^3$, and also typically characterized by a melt index of between about 0.6 and about 1.2. Further, when the write-on composition is one layer of a two-layer coextruded film structure, wherein the other layer is a slip agent-containing low density polyethylene bag film (routinely containing between about 500 ppm and about 2500 ppm slip agent, e.g., a $C_{18}$ to $C_{22}$ fatty acid amide, such as ecuramide), it has been observed that it is preferred to have the write-on film comprise greater than about 30 percent of the combined total thickness of the write-on film and bag film, preferably greater than 50 percent of the combined thickness. It has been observed that by making the thickness of the write-on film layer greater than about 30 percent of the total multilayer film thickness that the amount of slip agent which will bleed from the underlying slip agent-containing bag film to the write-on film surface is beneficially controlled, whereby the writability of the write-on surface is improved. Reference is made to FIG. 38 wherein a perspective view of such a multilayer, coextruded film is shown.

As aforementioned, the write-on composition may also contain a particulate material to improve the writability of the composition, when the write-on composition contains or is adjacent a material containing a slip agent. It has been observed that by providing an effective amount of a particulate material, i.e., an amount effective in reducing the detrimental effect of slip agent on writability of the surface of an article or film formed from the write-on composition, that the writability of the write-on surface as it ages is improved, as compared to the writability on the surface if the particulate material is not employed in an effective amount. Although, the selection of the particulate material and its relationship to the first polymer and second polymer is not fully understood, the selection is believed to be related to the ability of the selected particulate material to chemically and/or physically interact with a selected slip agent whereby the detrimental effects of slip agent on surface writability is decreased as a result of the addition of the particulate material to the write-on film composition.

One or more slip agents, e.g., preferably one or more $C_{18}$ to $C_{22}$ fatty acid amides, may be used in the bag film and the write-on composition, although it is preferred that no slip agent be employed in the write-on composition i.e., the write-on composition is preferably sans slip agent. This reference to "sans slip agent" refers to the write-on composition as formed, e.g., as extruded, and not to the write-on surface which may have slip agent present after extrusion as a result of being subjected to aging or physical contact with a second surface containing one or more slip agent components. As hereinafter discussed, slip agent may be present in the write-on compositions of this invention as a result of migration from coextrusion with a second plastic material or by contacting the write-on surface with a second plastic material containing slip agent, whereby slip agent is transferred to the write-on surface as a result of migration or simple physical contact of the second plastic material with the write-on composition.

As aforementioned, slip agent may be present at the write-on surface as a result of migration through the write-on composition from an adjacent material (commonly referred to as "bleeding" to the surface). Although the exact mechanism by which the selected particulate material provides a further reduction in interference of slip agent with surface writability over that observed by use of the instant write-on composition without a particulate material to provide an improved write-on surface is unclear, it has been observed that when the selection of the particulate material is properly correlated to the selected slip agent(s) that improvement in the writability of the aged, corona-discharge treated write-on surface is observed. This improvement is particularly beneficial when the write-on composition is a layer of a multilayer film formed as part of a bag body having a slip agent-containing bag film adjacent (in physical contact with) the write-on film composition as a coextruded multilayer film. This improvement in writability of the aged write-on surface has been observed to be quite dramatic for a write-on film coextruded with a slip-containing bag film when the coextruded material undergoes aging at temperatures above room temperature, i.e., above about 80° F. Since it is quite common during storage and shipment of bag and film products for such to be subjected to above room temperature for extended periods of time, this ability to retain writability after being subjected to such temperatures is an important write-on characteristic of the instant write-on compositions.

Particulate materials for use with various slip agents (including ecuramide) include: a fine particulate silica sold under the Trademark SYLOID TM and characterized as a particulate silica having a surface area of about 350 square meters per gram ($m^2/g$), an average particle size of about 3.0 microns and a density of about 8 pounds per cubic foot ($lbs/ft^3$); and calcium carbonate. It is believed that other suitable particulate silicas having surface areas between about 250 $m^2/g$ and 450 $m^2/g$ and average particle sizes between about 1 and about 5 microns may be employed. A particulate calcium carbonate found useful herein is a particulate calcium carbonate characterized by a particle distribution between about 2 and about 5 microns with 50 percent of the particles less than 2 microns and 30 percent of the particles less than 1 micron. The particulate material is beneficially selected to have irregularly shaped particles and have particles resistant to crushing during the process of writing upon the write-on surface with a pen. One calcium carbonate found useful in the instant invention is OMYACARB TM FT which is disclosed to be a fine wet ground, surface treated calcium carbonate ($CaCO_3$) specifically applicable for use in polyolefin films and having a mean particle diameter of 1.8 microns with a coarse fraction (top-cut) of 8 microns. Technical information on OMYACARB® $CaCO_3$ is available from OMYA in Technical Bulletin No. US-PL-3, entitled, "OMYACARB® $CaCO_3$ MINERAL ADDITIVES IN POLYOLEFIN FILMS", incorporated herein by reference thereto. Another calcium carbonate employable herein is Gama-Sperse CS-11 available from Geroga Marble Company. Gama-Sperse CS-11 is disclosed to be a stearate surface modified calcium carbonate having a median particle size of 3.9 microns (with 0.005 percent retained on a No. 325 wet screen) and a stearate content of 1.0 percent. Other particulate materials may be employed as fillers and the like as second particulate materials including silicas, talc, titanium dioxide, starch and mixtures thereof.

The particulate material is typically present in an effective amount, as above discussed, and is typically present in an amount between about 3.0 and about 20.0 weight percent, preferably between about 10 and about 15 weight percent based on the total weight of the write-on composition, including the polymer components and various additives. The above "effective amount" of particulate material is believed to be an effective amount correlated to the amount of slip agent present in most extruded or blown films, i.e., when the slip agent component is employed in an amount between about 500 ppm (parts per million) and about 2500 ppm (based on the total weight of the film composition) and more typically in an amount between about 1000 ppm and about 2000 ppm.

When the write-on composition is a write-on film surface it is typically employed as a component of a larger article or film structure. Owing to the relative cost of the various plastic materials suitable for forming an article or film (e.g., polyethylenes, polypropylenes and the like), performance specifications for a selected product or other design parameters for a product, it is typically preferable to employ the write-on composition as a minor component of an overall structure, although the write-on composition may be used to form an article or film without other polymer components if such is desired. The cost of doing such is rarely justified, unless the entire surface is to be a write-on surface. In a broad sense, when the write-on composition is formed as a write-on film it may be used in conjuction with any article or other surface to which it may be affixed by adhesive, thermal or other suitable chemical or physical bonding means. When the write-on composition is formed into a film it may be advantageously employed as a write-on area, e.g., a stripe, on a bag body and, further may be provided as a coextruded or blown film component formed adjacent the film comprising the bag body. The final film composite will be a multilayer film structure wherein the write-on film is one layer and the bag film is a second layer. Alternatively, the write-on film may be extruded as a second layer on an already formed bag film forming at least a two-layer multilayer structure or, alternatively, may be provided as a separate component by suitable bonding to a previously formed bag film or an article.

Figure 37:
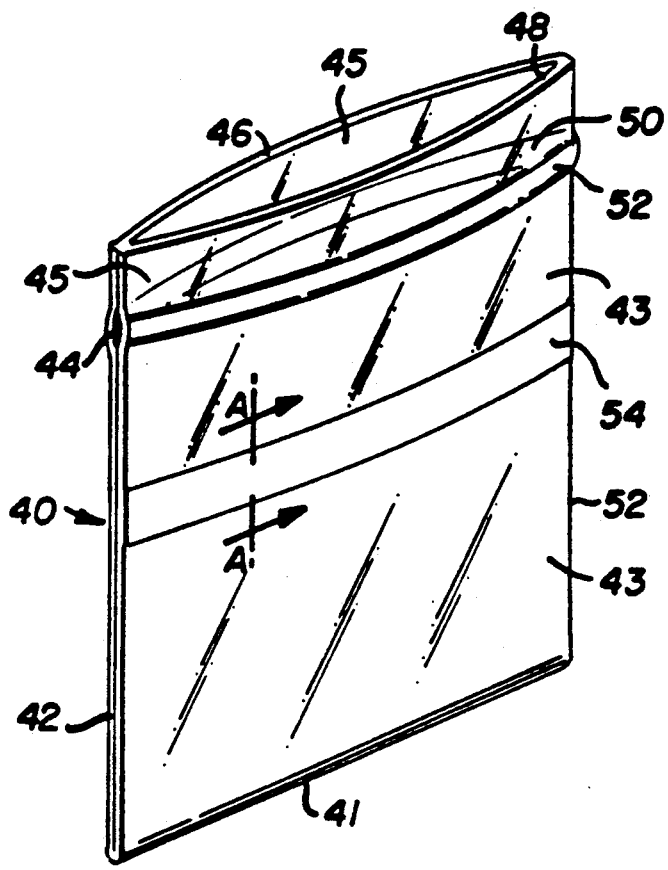
FIG. 37 is a perspective view of a flexible container including a write-on surface in accordance with the invention and an optional reclosable fastening device.

In one embodiment a write-on film is provided as a component of an overall film structure for use in bag manufacturing. In this embodiment a write-on film surface is provided in conjunction with a bag film structure which may be employed for manufacturing a wide variety of bags heretofore known in the art, including pouch-type bags, disposer-type bags, handle-type bags, utility-type bags, drawstring-type bags, food storage bags, sandwich bags, various types of closure-type bags and the like. Representative of drawstring bags wherein a write-on surface may be provided are disclosed in U.S. Pat. Nos. 3,414,032; 3,506,048; 3,687,357; 3,547,341; 4,629,654; and 4,664,649; said patents incorporated herein by reference. Representative of closure-type bags wherein a write-on surface may be provided are disclosed in U.S. Pat. Nos.: 28,969; 2,978,768; 3,038,225; 4,212,337; 3,363,345; 4,733,778; 4,736,450; 4,822,539; and 4,829,641; said patents incorporated herein by reference. When the closure bag is a color change closure bag as disclosed in U.S. Pat. Nos. 4,363,345 and 4,829,641 it is preferred to provide the write-on surface on the sidewall of the bag having the translucent closure element, although such is not required. By providing the write-on surface on the sidewall having the translucent closure element the user of the closure bag can first close the bag while observing the color change of the color change closure and then write on the write-on surface without the necessity of turning over the bag to access the write-on surface. The embodiment wherein a write-on stripe is provided on a sidewall of a closure-type bag is shown in FIG. 37. FIG. 37 shows a typical flexible container 40 formed from a thin plastic film which has been folded to define a bottom portion 41 and heat sealed along vertical edges 42 to form a pouch. The sidewalls 43 extend beyond a closure device (optional) comprised of closure elements 50 and 52 to provide flanges 45 and mouth portions 46 and 48 to simplify the opening and closing of closure elements 50 and 52. A write-on stripe surface 46 is provided according to the instant invention.

The term "film", as used herein and in the prior art, represents any three-dimensional material which possesses two opposite facing surfaces separated by edging surfaces. The opposite facing surfaces may be mono- or poly-planar and the combined surfaces typically (and preferably) possess many times the area of the edge surfaces. The film, e.g., bag film, which may be employed with a write-on surface in the practice of the invention may be any film, including plastic, resin, metal, textile, fiber reinforced plastic or resin, ceramic, glass, rubber, paper and cardboard, wallboard, composites thereof, and the like to which the write-on film may be associated, e.g., affixed. The composite films may be employed to make bag structures. The films employed in the manufacture of bags are typically polyolefin thermoplastic films such as one or more layers of one or more of polyethylene (low density, high density, linear low density, ultra low density and/or combinations thereof), polypropylene, polyethylene copolymers (low density, linear low density, ultra low density, high density and/or combinations), polybutylenes, ABS polymers, polyurethanes, polycarbonates, polysulphones, aliphatic polyamides, polyarylamides, polyaryletherketones, polyarylimideamides, polyaryletherimides, polyesters, polyarylates, polyoxymethylene, poly(epsilon-caprolactone), and the like, alone or composited with a variety of materials, such as metal films, paper, cardboard, textile structures, wood, and the like.

The write-on compositions of the instant inventions are preferably employed as films and may be extruded or blown, preferably extruded, using conventional manufacturing processes and parameters. For example, the instant write-on compositions may be employed as an extruded write-on stripe on a thermoplastic film, e.g., a 0.5 to 1 inch wide stripe. When the film is employed to form a bag the stripe may be extruded onto the outer surface of at least one sidewall of the bag body. Further, the write-on film composition may be coextruded or formed as a blown multilayer film with the bag film composition. The result of coextrusion or a multilayer blown film results in efficient use of materials and results in thermal fusion, i.e., bonding, of the bag film and the write-on film composition. It has been observed (discussed in greater detail in reference to FIG. 38) that the coextrusion of the bag film and the write-on film stripe results in a thin layer of the bag film underlying the write-on film in the final multi-layered film. FIG. 38 shows a cross section of a bag film 60 and write-on film 58 formed by coextrusion. The coextrusion results in a thin layer of bag film 62 adjacent the thicker layer 58 of the write-on film.

The write-on film compositions of the instant invention are surface treated to provide the final write-on surface upon which a user will write for identification of some feature associated with use of the write-on surface. The most commonly employed surface treatment is corona-discharge treatment. The use of corona-discharge treatment to modify the surface of a thermoplastic material to improve its write-on characteristics is disclosed in U.S. Pat. Nos. 2,810,933; 2,844,731; 4,051,044; and 4,710,358; said patents incorporated herein by reference. Corona discharge treaters are commercially available from numerous equipment manufacturers Pillar Corporation, 475 Industrial Drive, Hartland, Wis. 53029, offers a line of corona treating power supplies in several wattages useful for corona-discharge treating thermoplastic materials. In one embodiment the write-on surface is present on the outer surface of a bag sidewall and is corona-discharge treated at between about 50 and 150 watts/in$^2$, preferably between about 100 and about 150 watts/in$^2$, using an arc-shaped treater approximately 1/16 inch from a silicon sleeved roller.

The write-on compositions of the instant invention have been described with respect to the first polymer and second polymer components and, optionally, the particulate material. The write-on composition may also contain commonly employed "additive" components as heretofore employed for the manufacture of polymer compositions. For example, it is within the scope of the instant write-on compositions to use various polymer additives, including, but not limited to, dyes, pigments, colorants, fillers, fluoroelastomers, starch and cellulosic components, crosslinking agents, and mixtures thereof. It has been observed that the addition of starch to the write-on composition may further enhance the write-on characteristics of the write-on surface. As well known in the art, such additive components may typically be employed in an amount up to about 20 percent by weight or more of the overall weight of the write-on composition. It is preferred that the write-on composition contain no added slip agent, i.e., be sans slip agent, or contain the minimum amount required to carry out the manufacturing process wherein the write-on composition is processed, e.g., extruded or blown as a film. As will be readily apparent to one skilled in the art of extruding or blowing film products, the use of a slip agent may be required in some instances to effectively manufacture film products.

In one embodiment the write-on composition is provided as the component of a bag, preferably comprising a bag body having a reclosable feature, e.g., an adhesive or interlocking closure device attached thereto. In general, the bag may be any of those disclosed heretofore in the prior art and includes bags having features such as gussets, drawstrings, handles and the like. When the write-on composition of the instant invention is employed to provide a write-on area on the outer surface of the sidewall, any of the well known manufacturing processes for manufacturing the bag may be employed. The bag body may be coextruded with a write-on stripe formed from the write-on compositions of the instant invention.

The instant invention also relates to a stack of bags comprising a plurality of bags, said bags having a write-on surface on a first bag sidewall and stacked in an alternating contacting manner such that said write-on surface on a first sidewall contacts a surface on a second sidewall having a slip agent therein, wherein the write-on surface comprises a corona-discharge treated, embossed write-on film wherein the write-on surface comprises:

a) a physical mixture of two substantially incompatible polymers wherein said second polymer is substantially incompatible in said first polymer; and
b) a first particulate material comprising a particulate calcium carbonate in an effective amount to improve the writability of the corona-discharge treated write-on surface in contact with the slip agent-containing second sidewall. In a further embodiment the invention relates to a stack of bags as aforementioned, comprising a corona-discharge treated write-on film surface wherein the film comprises:

a physical mixture of two substantially immiscible polymers wherein said second polymer is present in a minor amount and is a polyisobutylene and said first polymer is present in a major amount and is a low density polyethylene; and
b) a particulate calcium carbonate material in an effective amount to improve the writability of said write-on film surface.

EXPERIMENTAL PROCEDURE

The film samples shown in FIG. 1 to FIG. 36 and discussed in Examples 1 to 16, inclusive, and as discussed hereinafter were prepared by coextruding a multilayer film comprising a low density polyethylene bag film comprising a low density polyethylene containing 1550 ppm of a slip agent (ecuramide) with a write-on film composition, as described in the DESCRIPTION OF THE DRAWINGS and in following examples, whereby a two layer film structure was formed, as shown in FIG. 38.

The write-on compositions of the instant invention were prepared by mixing the major resin component (low density polyethylene) into a container with the remaining components added thereafter by physical blending. The combined components were physically mixed until a homogeneous blend was observed. An extruded bag film was formed with a coextruded write-on composition as a write-on film stripe (as a 1.0 inch wide write-on stripe).

Referring to FIG. 37 and FIG. 38, the two layer film portion formed by the coextruded write-on film and bag film had a total thickness of about 2.8 mil. The bag film on either side of the two layer write-on film/bag film had a film thickness of about 2.5 mils. The thickness of the layer of coextruded bag film physically adjacent and in contact with the write-on film layer was about 2.1 mil. and the thickness of the write-on film was about 0.7 mil.

Where indicated hereinafter, the write-on film compositions were prepared using masterbatch components as follows:

MASTERBATCH NO. 1

5 weight percent eurcimide in a low density polyethylene carrier polymer.

MASTERBATCH NO. 2

70 weight percent $TiO_2$ and in a low density polyethylene carrier polymer.

MASTERBATCH NO. 3

10 weight percent SYLOID ™ silica in a low density polyethylene carrier polymer.

MASTERBATCH NO. 4

50 weight percent calcium carbonate in a low density polyethylene carrier polymer.

The film samples were prepared for the photomicrograph by the standard gold sputtering method used for S.E.M. of dielectric materials. A photomicrograph of each sample was taken at magnifications of two hundred ($200\times$) and two thousand ($2000\times$).

The samples in each example were also provided with an embossed roll surface characterized as a gritblasted matte surface available from PAMARACO, Inc. Roselle, N.J. as pattern PAMA 14. The write-on film surfaces were then tested for their writability by writing on each sample with a medium point ballpoint pen.

Figure 2:
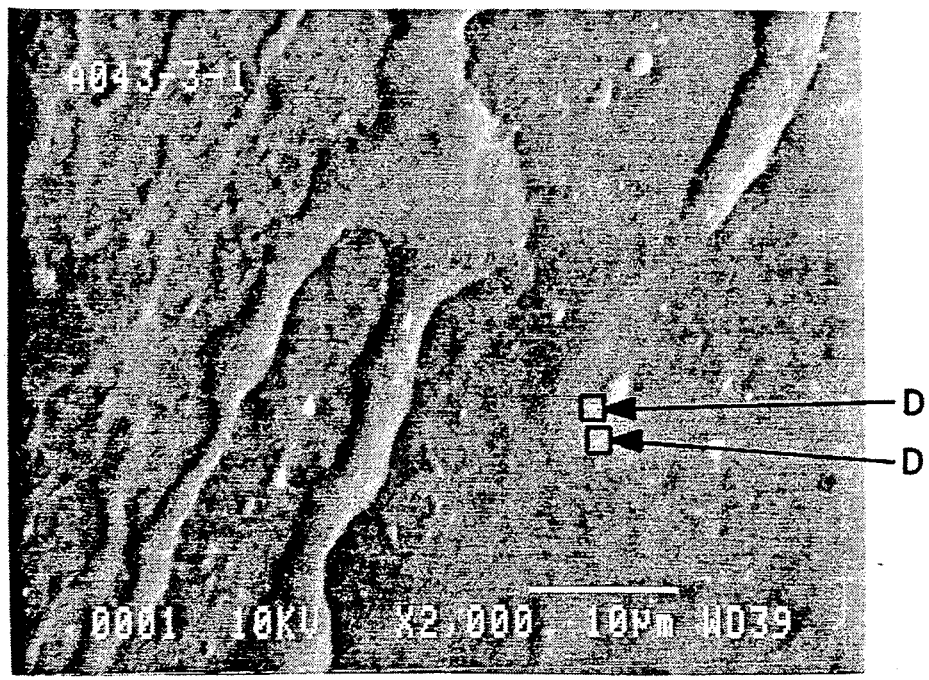
FIG. 2 is a 2000× photomicrograph illustrating a portion of the film of FIG. 1.

EXAMPLE 1 (FIG. 1 and FIG. 2)

This sample is a control sample containing 3000 ppm of the slip agent ecuramide and 4.5 weight percent Masterbatch No. 2 with the remainder comprising a low density polyethylene. The film sample was not surface treated by corona-discharge. Flat slip agent crystals are shown in this photograph as "A". The indentations shown as "B" on FIG. 1 represent the embossed pattern formed by use of the roll having the PAMA 14 pattern. The area designated by "C" demonstrates that the ink is not wetting the untreated film surface. FIG. 2 shows a $2000\times$ magnification of area "C" of FIG. 1 further showing that the untreated film is not wet by the ink. In addition, FIG. 2 evidences the presence at the film surface of $TiO_2$ particles which are designated as "D".

Figure 3:
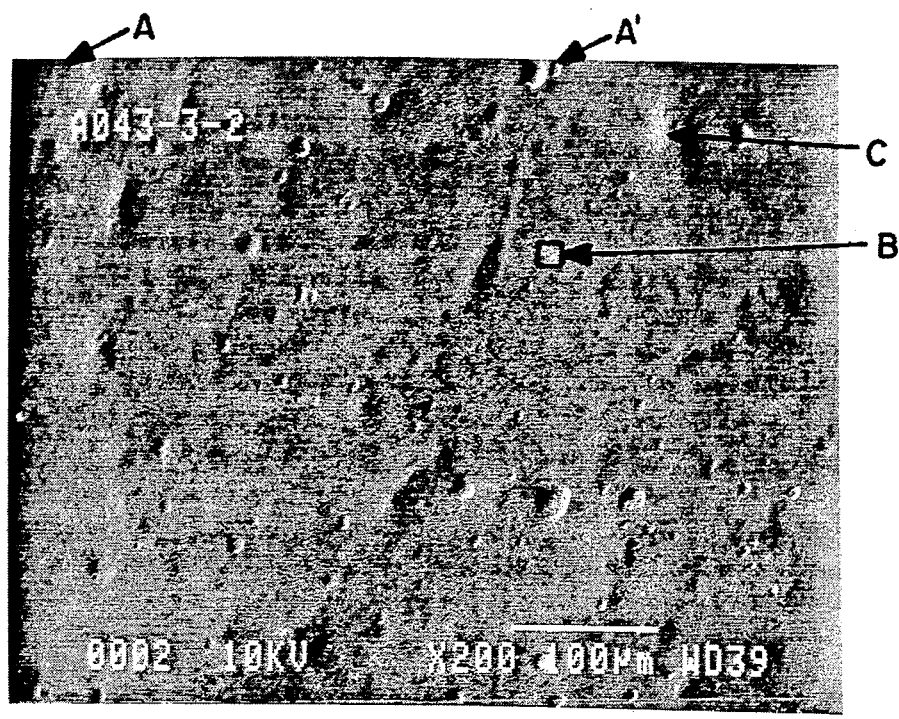
FIG. 3 is a 200× photomicrograph illustrating a portion of a film the same as shown in FIG. 1 but corona-discharge treated at 63.8 watts per square inch.
Figure 4:
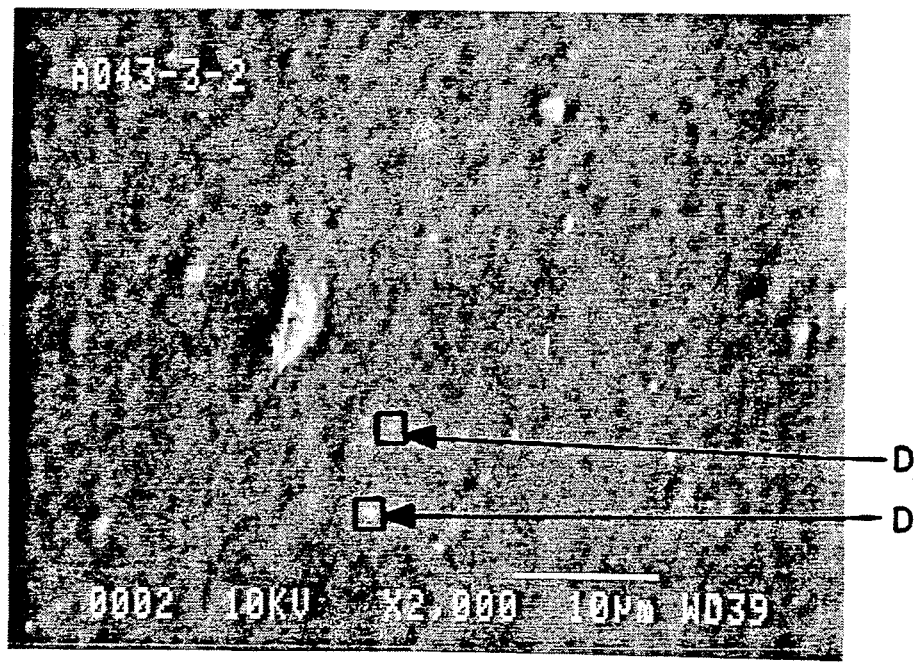
FIG. 4 is a 2000× photomicrograph illustrating a portion of the film of FIG. 3.

EXAMPLE 2 (FIG. 3 and FIG. 4)

The film sample shown in FIGS. 3 and 4 is identical to that shown in FIG. 1, except the sample was corona-discharge surface treated at about 63.8 watts per square inch. FIG. 3 and FIG. 4 show the effect the corona-discharge treating has on the slip agent crystals on the film surface. FIG. 3 shows that the ink is now wetting the surface in the area between A and A'. Per the theory for corona-discharge treatment, it is believed that the corona-discharge surface treatment "burns off" slip agent on the surface at the time of treatment, since the melting point of the slip agent (ecuramide) is only about 90 degrees centigrade (C). However, it has observed herein that slip agent (shown as "B") will migrate to the film surface and that this migrating slip agent cannot be burned off by the initial corona-discharge treatment, since it is not on the film surface during the corona-discharge treatment. This slip agent bleeds to the film surface after corona-discharge surface treatment as the film ages and as the film is subjected to varying temperature conditions.

FIG. 3 and FIG. 4 also show surface $TiO_2$ particles "D" and embossed areas "C".

Figure 5:
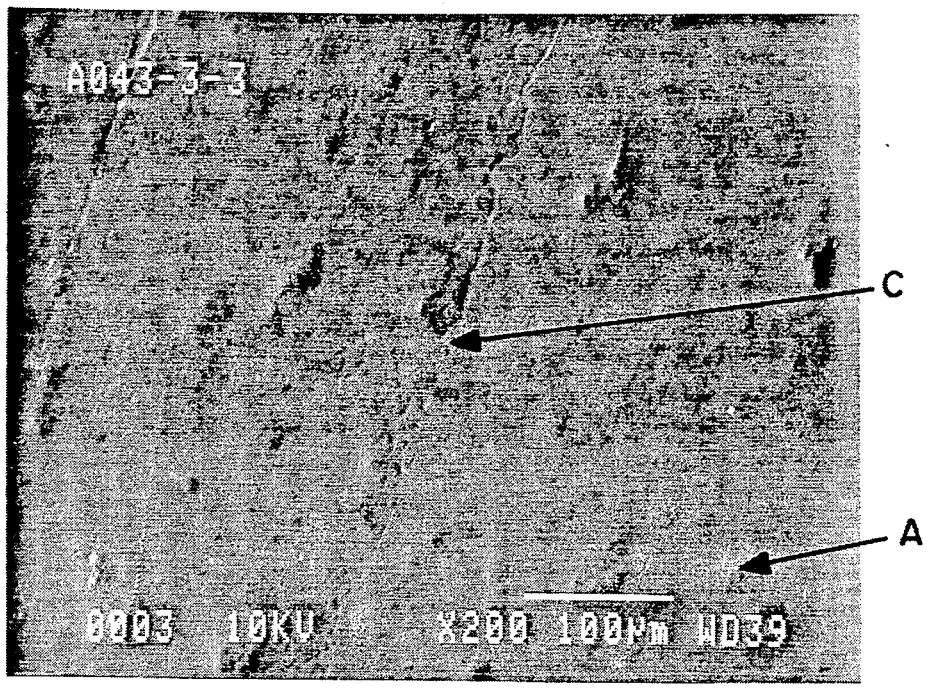
FIG. 5 is a 200× photomicrograph illustrating a film surface containing a non-wetting surface having an embossed surface, no slip agent and which has not been corona-discharge treated.
Figure 6:
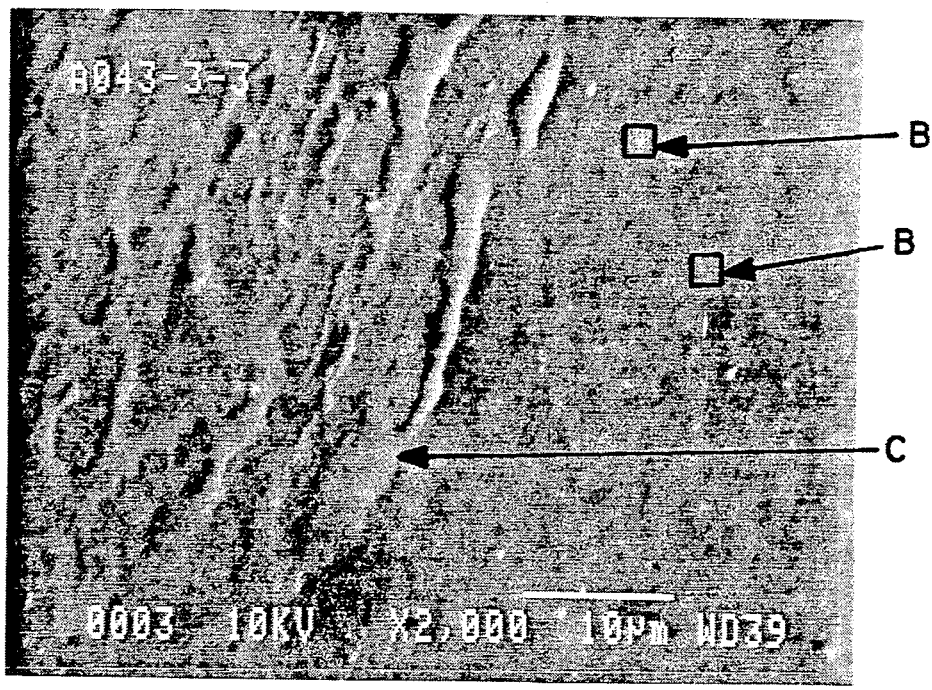
FIG. 6 is a 2000× photomicrograph illustrating a portion of the film of FIG. 5.

EXAMPLE 3 (FIG. 5 and FIG. 6)

This film sample is the same as shown in FIG. 1 and 2, except it contains no slip agent. The crystals identified in FIGS. 1, 2, 3 and 4 as slip agent are no longer observed, although embossed area "A" and $TiO_2$ particles "B" are observed on the film surface. FIG. 5 and FIG. 6 demonstrate that the untreated film surface (no corona-discharge treatment) is not wet by the ink (shown at "C"). FIG. 5 and FIG. 6 demonstrate the reliable, visual identification of the slip agent in FIG. 1 and FIG. 2. As aforementioned, the slip agent crystals are evidenced by the flat crystalline structure of the slip agent (ecuramide) crystals.

Figure 7:
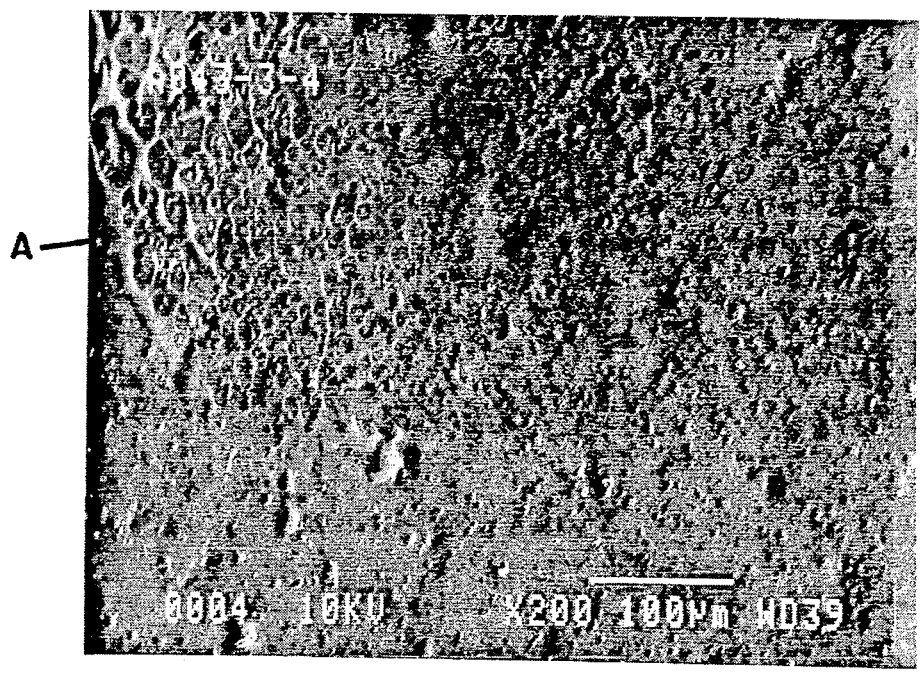
FIG. 7 is a 200× photomicrograph illustrating a film surface of a write-on film (containing a polyisobutylene component according to the instant invention) before corona-discharge treatment.
Figure 8:
FIG. 8 is a 2000× photomicrograph illustrating a portion of the film of FIG. 7.

EXAMPLE 4 (FIG. 7 and FIG. 8)

FIG. 7 and FIG. 8 show a write-on film, according to the invention containing 10 weight percent EXXELOR TM PA-30, 3000 ppm slip agent, 4.5 weight percent of white masterbatch 2, with the remainder of the write-on composition being low density polyethylene. The film was not corona-discharge surface treated.

Referring to FIG. 7 and FIG. 8, it is readily apparent that the untreated film surface is dramatically different than the film surfaces shown in FIGS. 1 to 6, in that the film surface of FIG. 7 is extremely rough with an increased number of bumps. The observed bumps are caused by the substantial incompatibility of the polyisobutylene compound in the LDPE (low density polyethylene) component of the overall write-on film composition. Surprisingly, crystals of slip agent are not readily observed in FIG. 7 or FIG. 8, demonstrating that some modification of slip agent at the write-on film surface has resulted from addition of the substantially incompatable polyisobutylene to the low density polyethylene.

It is also observed that the ink (shown at "A" of FIG. 7) does not readily wet the film's untreated surface. The addition of the polyisobutylene component (shown as "B" on FIG. 8) alone did not facilitate significant wetting of the untreated film by the ink. The observed increase in roughness resulting from the presence of the polyisobutylene-containing component may also aid the rolling of the ball point in a ball point pen over the write-on film surface, although FIG. 7 and FIG. 8 demonstrate that the film surface must still be treated, e.g., corona-discharge treated, to allow the ink to wet the write-on film surface, as further discussed hereinafter in reference to FIG. 9 and FIG. 10.

Figure 9:
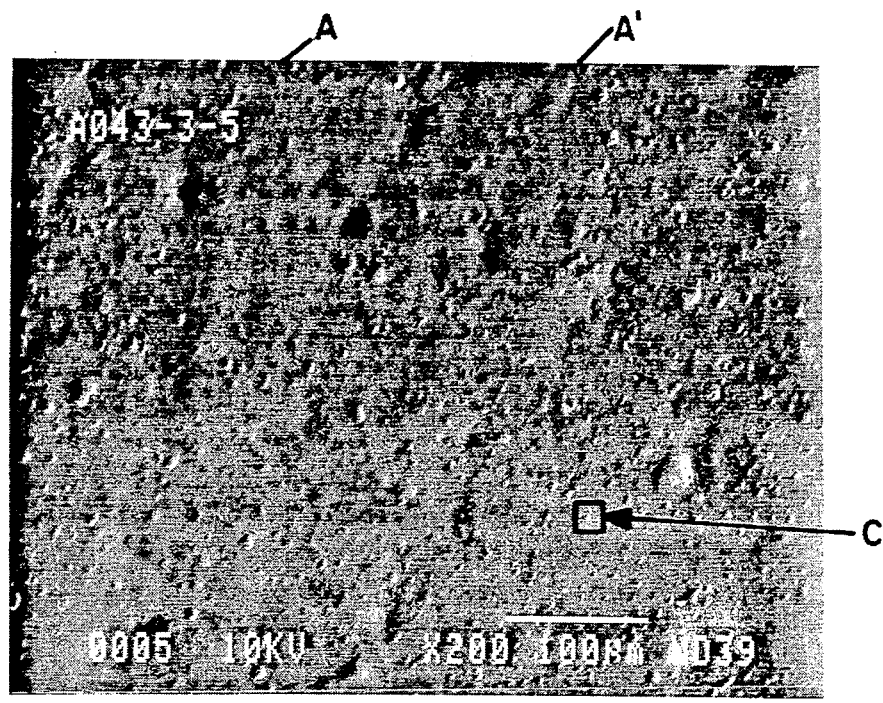
FIG. 9 is a 200× photomicrograph illustrating the same film surface depicted in FIG. 7, except the surface has been corona-discharge treated at 63.8 watts per square inch.
Figure 10:
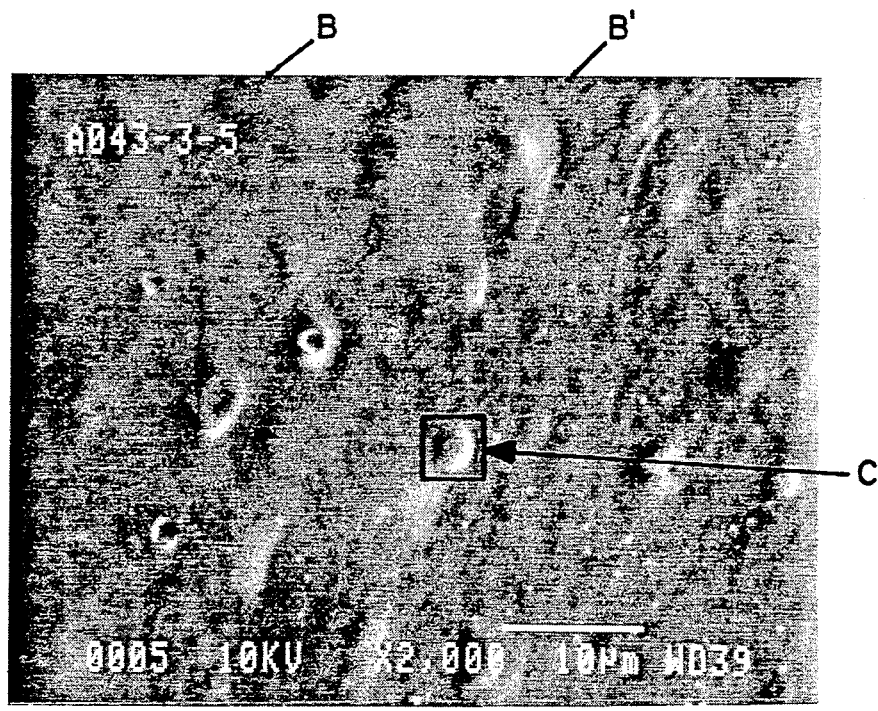
FIG. 10 is a 2000× photomicrograph illustrating a portion of the film of FIG. 9.

EXAMPLE 5 (FIG. 9 and FIG. 10)

The write-on film sample shown in FIG. 9 and FIG. 10 is the same as the film sample shown in FIG. 7 and FIG. 8, but the film has been corona-discharge treated at about 63.8 watts per square inch.

As shown in FIG. 9 and FIG. 10 the ink (between A and A' on FIG. 9 and between B and B' on FIG. 10) has wet the write-on film surface. Further, the polyisobutylene particles (shown as "C") have not been observed to have been affected by the corona-discharge treatment.

Figure 11:
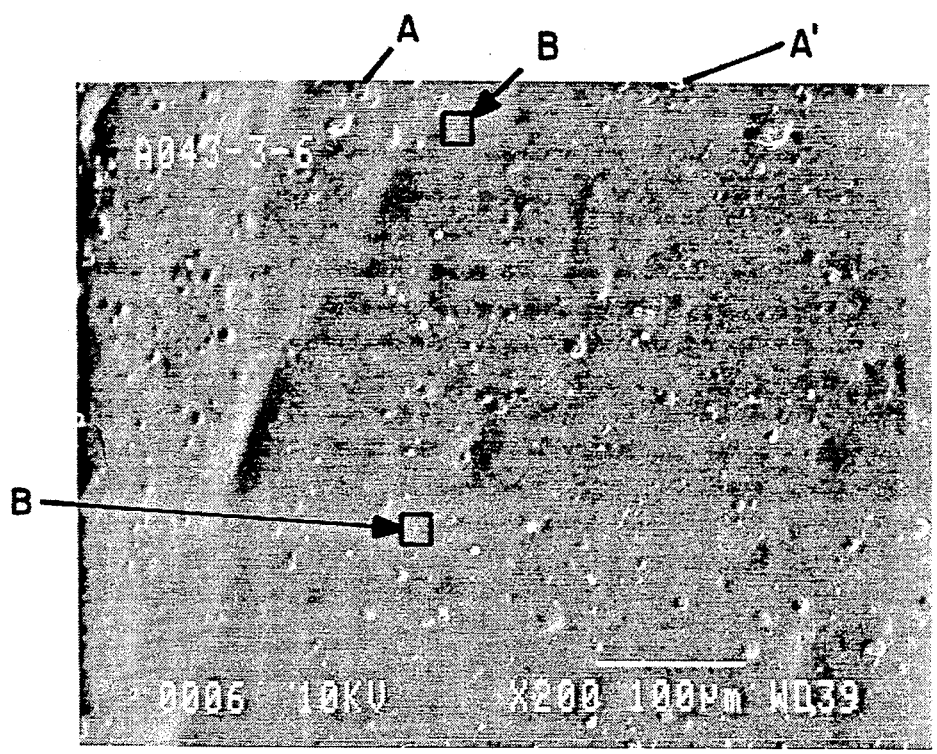
FIG. 11 is a 200× photomicrograph illustrating a film containing 3000 ppm slip agent and a $TiO_2$-containing white masterbatch with 10 weight percent of a SYLOID TM particulate silica which has not been corona-discharge treated.
Figure 12:
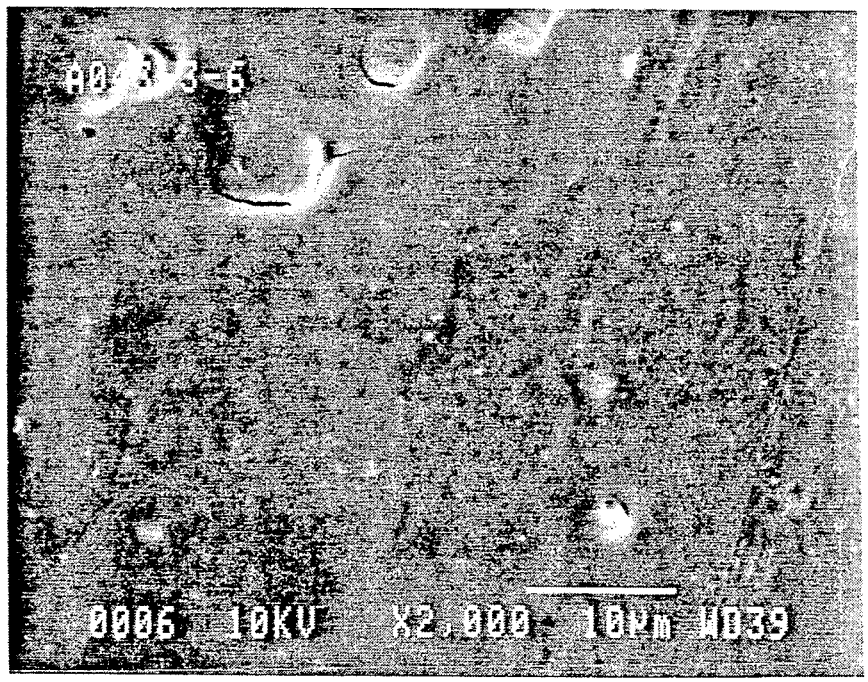
FIG. 12 is a 2000× photomicrograph illustrating a portion of the film surface depicted in FIG. 11.

EXAMPLE 6 (FIG. 11 and FIG. 12)

A comparative film sample is shown in FIG. 11 and FIG. 12 containing a 4.5 wt. % Masterbatch No. 2, 10 wt. % SYLOID TM Masterbatch No. 3, and 3000 ppm slip agent (ecuramide) with the remainder being a low density polyethylene. The film sample was corona-discharge treated at 44.7 watts per square inch.

The corona-discharge treatment resulted in the ink (area between A and A') being able to wet the film surface. Although most of the particles seen at the film surface are the SYLOID TM silica particles "C", slip agent crystals "B" are observed at the film surface. It is readily observed that the film surface is not as rough as the film surface containing polyisobutylene, as shown in FIG. 9. Slip agent crystals are observed in FIG. 11 and FIG. 12 as flat crystal protrusions projecting from the film surface.

Figure 13:
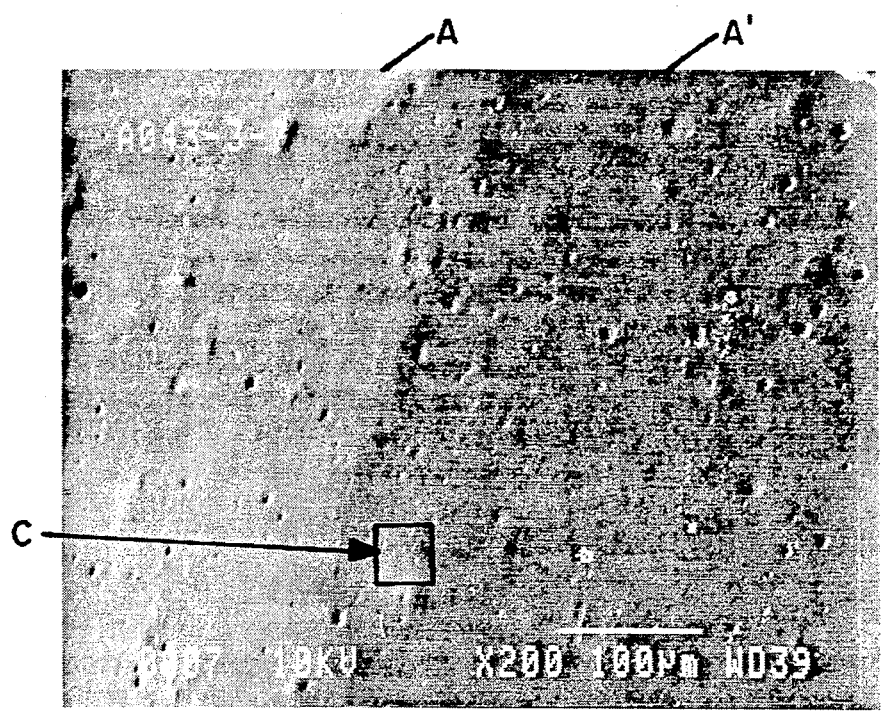
FIG. 13 is a 200× photomicrograph of the film shown in FIG. 11 which has been corona-discharge treated at 44.6 watts per square inch (watts/in²).
Figure 14:
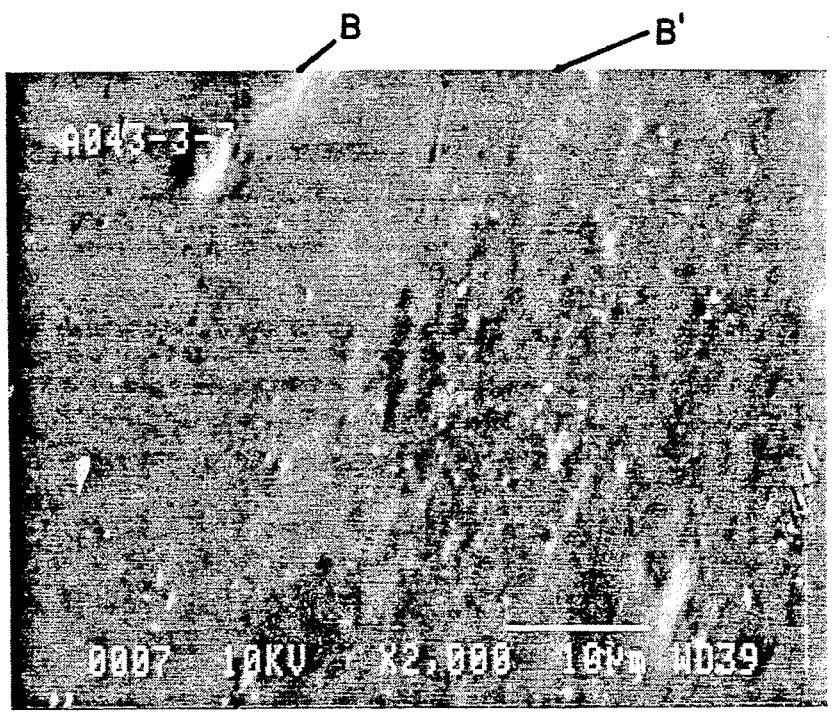
FIG. 14 is a 2000× photomicrograph illustrating a portion of the corona-discharge treated film surface depicted in FIG. 13.

EXAMPLE 7 (FIG. 13 and FIG. 14)

A comparative film sample shown in FIG. 13 and FIG. 14 was prepared containing 10 wt. % of SYLOID TM silica Masterbatch No. 3 and 4.5 wt. % Masterbatch No. 2 with the remainder being a LDPE. The film sample was corona-discharge treated at about 44.7 watts per square inch. FIG. 13 demonstrates that this sample has a high concentration of slip agent crystals on corona-discharge treated surface. The presence of slip agent crystals in FIG. 13 is not surprising, since the film surface is abutted on three of it's four sides by a bag film containing a high concentration of slip agent. The observation of slip agent crystals in FIG. 13 and FIG. 14 is to be contrasted with the write-on film surface according to the instant invention, containing the polyisobutylene component as discussed above in Examples 4 and 5. Further, the film was wet by ink between A and A' of FIG. 13 and between B and B' of FIG. 14.

Figure 15:
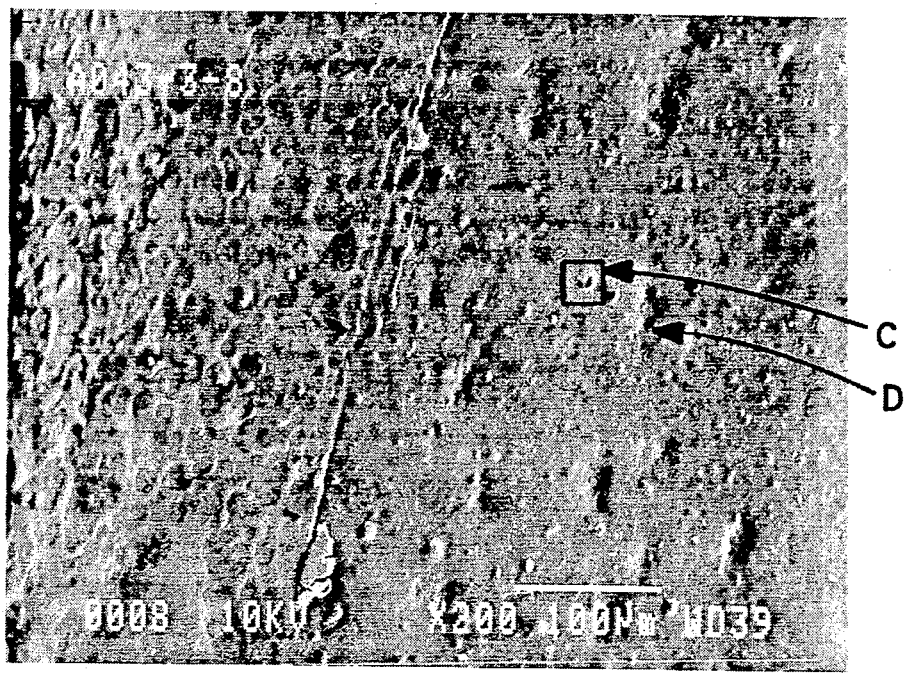
FIG. 15 is a 2000× photomicrograph illustrating a portion of the film surface depicted in FIG. 16.
Figure 16:
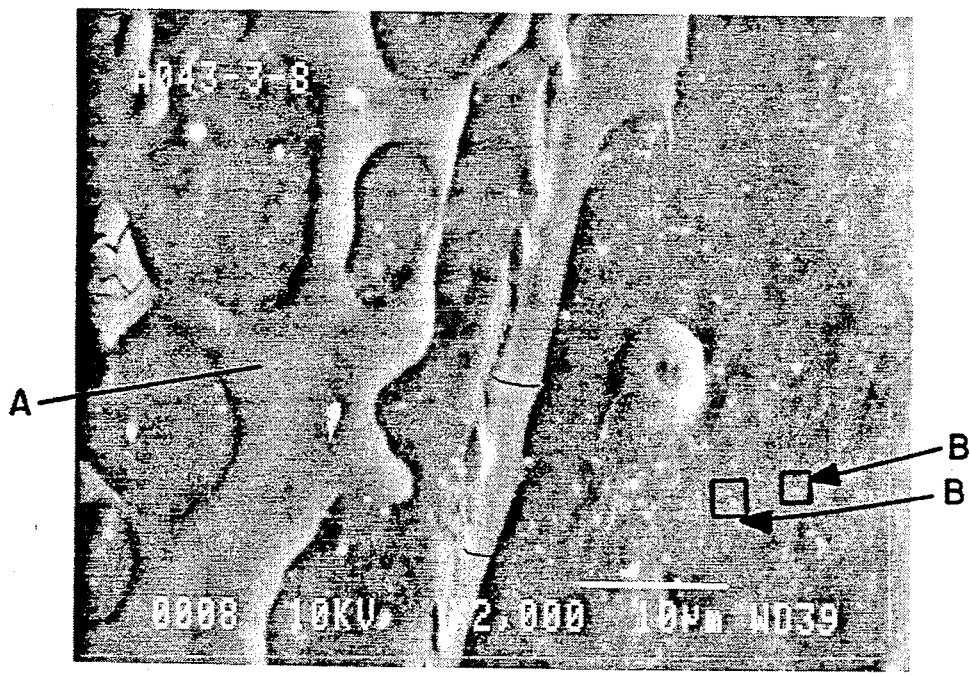
FIG. 16 is a 200× photomicrograph illustrating a film containing and a $TiO_2$-containing white masterbatch with 10 weight percent SYLOID TM particulate silica and which was corona-discharge treated at 46.6 watts per square inch.

EXAMPLE 8 (FIG. 15 and FIG. 16)

A write-on film sample according to the instant invention is shown in FIG. 15 and FIG. 16 was formed containing 10 wt. % EXXELOR TM PA-30, 10 wt. % Masterbatch No. 3, 4.5 wt. % Masterbatch No. 2 with the remainder of the write-on composition being a low density polyethylene. The write-on film was not corona-discharge surface treated. FIG. 15 and FIG. 16 demonstrate that the untreated film surface was not readily wet by the ink at "A". This should be compared to FIG. 7 showing that EXXELOR TM PA-30 component alone with no corona-discharge treatment also did not aid in ink wetting of the film surface. This film sample demonstrates that use of both EXXELOR TM PA-30 and the SYLOIDs TM silica (shown at "C" in FIG. 15) did not aid in the wetting the untreated film surface by the ink. Further, TiO$_2$ particles are shown at "B" of FIG. 16 and the embossed pattern indentations are shown at "D" of FIG. 15.

Figure 17:
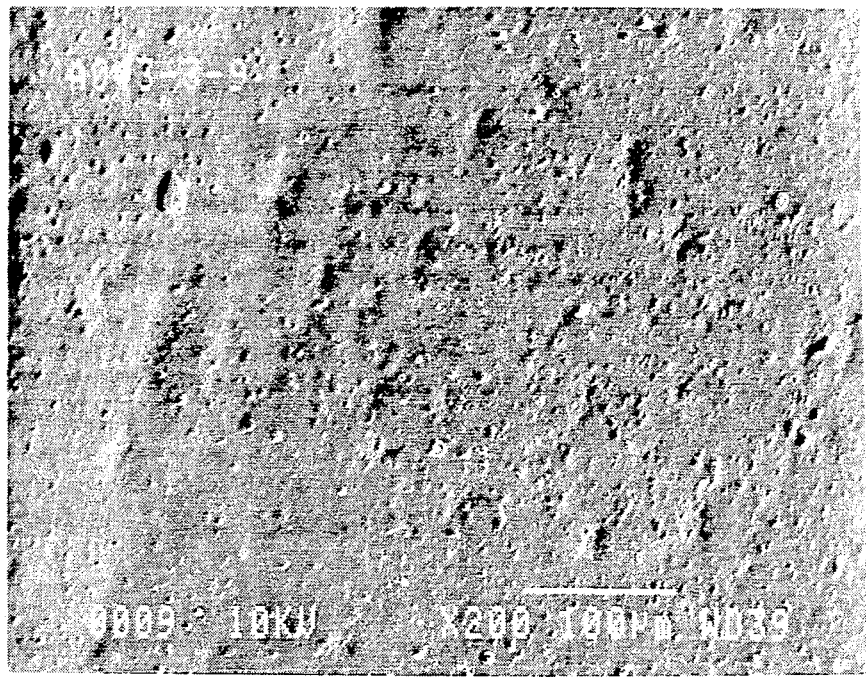
FIG. 17 is a 200× photomicrograph illustrating a film surface of a write-on film containing a polyisobutylene component, 1000 ppm slip agent, 5000 ppm Super Floss TM, and 4.5 wt. % of a white masterbatch, and which was corona-discharge treated at 44.6 watts per square inch.
Figure 18:
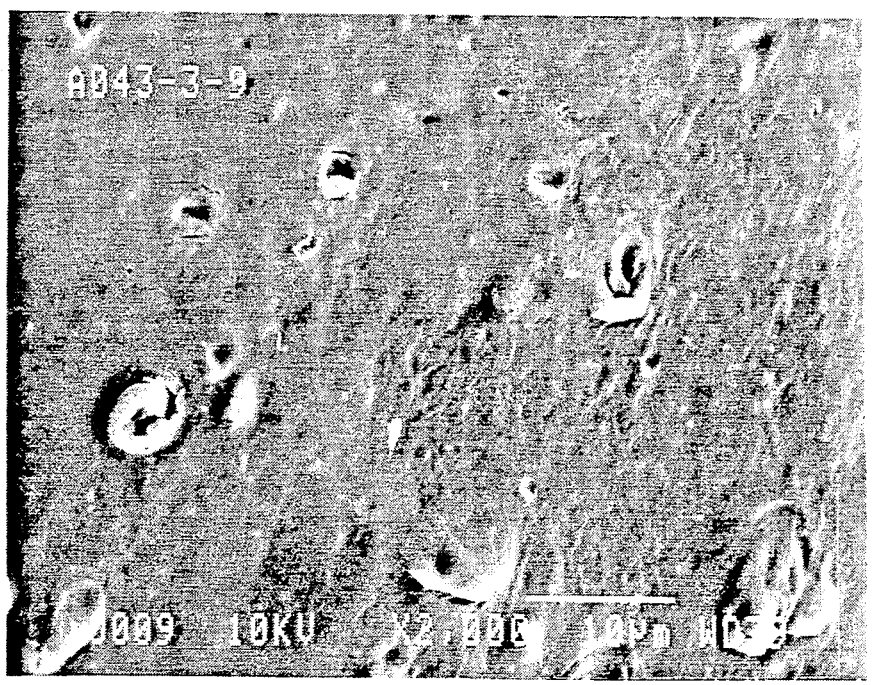
FIG. 18 is a 2000× photomicrograph illustrating a portion of the film surface depicted in FIG. 17.

EXAMPLE 9 (FIG. 17 and FIG. 18)

A write-on film sample, according to the instant invention, is shown in FIG. 17 and FIG. 18 and contains 10 wt % EXXELOR TM PA-30, 1000 ppm slip agent (ecurimide), 5000 ppm of a diatomaceous earth, 4.5 wt. % Masterbatch No. 2 with the remainder of the write-on composition being a low density polyethylene. The film sample was corona-discharge treated at about 44.7 watts per square inch and aged at room temperature, i.e., about 25° C. Although it has been observed that the SYLOIDs TM help prevent deterioration in the writability of an aged write-on film sample, similar testing of the sample of FIGS. 17 and 18 showed the natural diatomaceous earth (silica-containing) samples did not provide such a beneficial effect.

Figure 19:
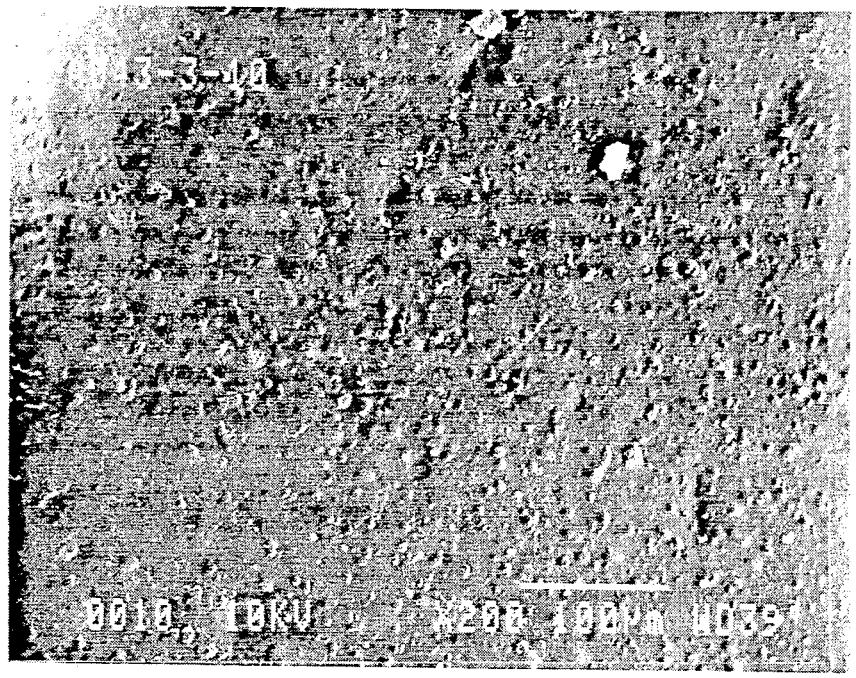
FIG. 19 is a 200× photomicrograph illustrating a film surface of a write-on film containing a polyisobutylene component (EXXELOR TM PA-30) with 10 weight percent SYLOID TM particulate silica and which was corona-discharge treated at 44.6 watts per square inch.
Figure 20:
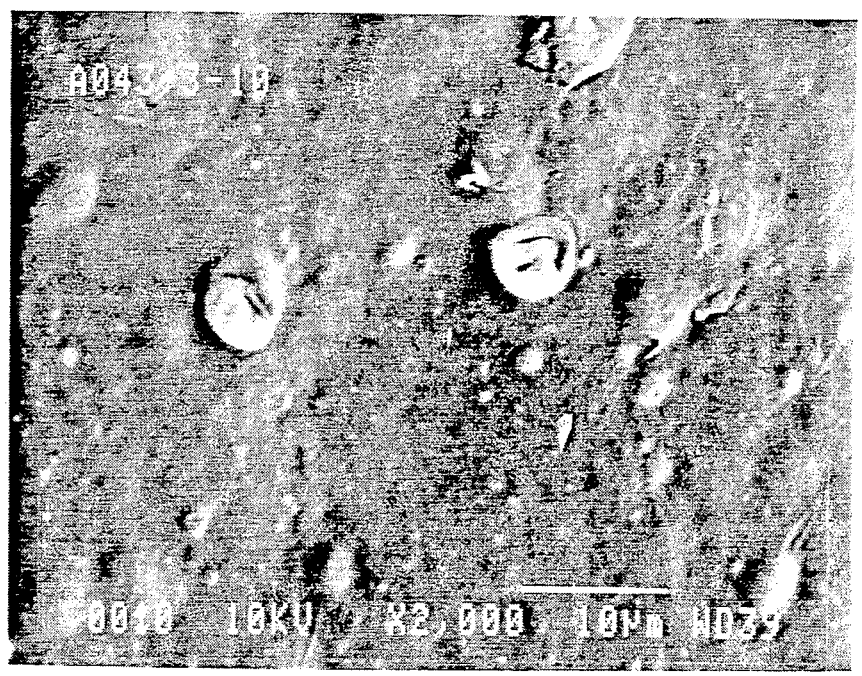
FIG. 20 is a 2000× photomicrograph illustrating a portion of the film surface of FIG. 19.

EXAMPLE 10 (FIG. 19 and FIG. 20)

The write-on film sample, shown in FIG. 19 and FIG. 20 was corona-discharge treated at 44.7 watts per square inch. This sample is the same as the sample shown in FIG. 15 and FIG. 16, except the sample has been given a corona-discharge treatment.

FIG. 19 and FIG. 20 demonstrate the effect of the corona-discharge treatment on a film composition containing a polyisobutylene component (EXXELOR TM PA-30) and a SYLOID TM silica, in that the ink is observed to wet the corona-discharge treated film surface. Further, the two film samples shown in FIG. 15 and FIG. 19 are identical, except for the corona-discharge treatment. FIG. 19 demonstrates the presence of the polyisobutylene component at the film surface after corona-discharge treatment.

Figure 21:
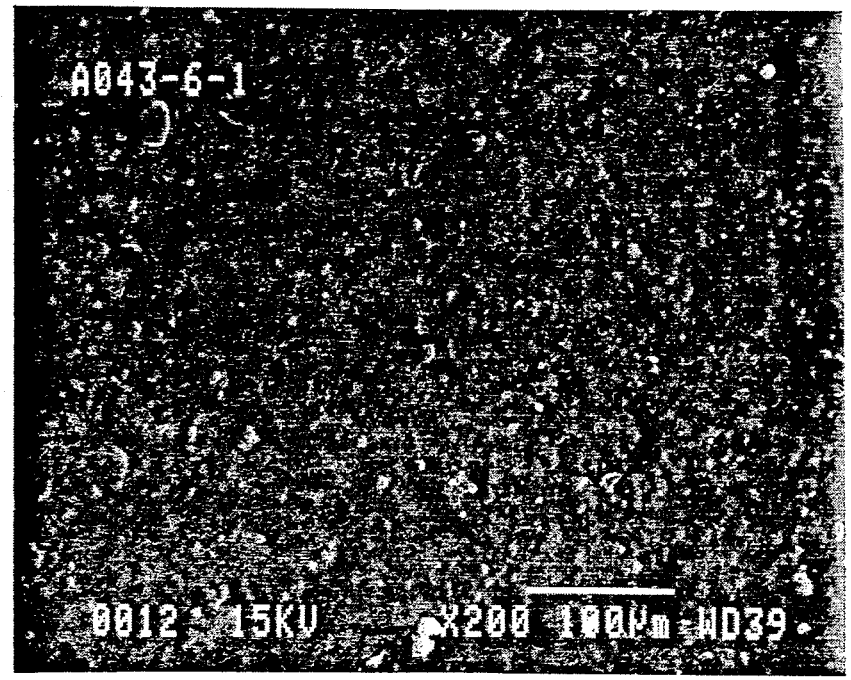
FIG. 21 is a 200× photomicrograph illustrating a film surface of an aged write-on film according to the invention containing a polyisobutylene component, a SYLOID TM particulate silica and which was not corona-discharge treated.
Figure 22:
FIG. 22 is a 2000× photomicrograph illustrating a portion of the film surface depicted in FIG. 21.

EXAMPLE 11 (FIG. 21 and FIG. 22)

The write-on film sample shown in FIG. 21 and FIG. 22 contains 10 wt % Masterbatch No. 3 and 15 wt % EXXELOR TM PA-30 with the remainder being a low density polyethylene. The write-on film sample was room temperature (about 25° C.) aged for 90 days after corona-discharge treatment at 51 watts per square inch.

Referring to FIG. 21, it is observed that this film sample exhibits the rough surface characteristic of the substantially incompatible polymer mixture of polyisobutylene and low density polyethylene. Further, the SYLOID TM particulate silica particles (particles having a size of about three microns) are also observed at the film surface. Rounded particles are also observed in FIG. 21 and FIG. 22 and are believed to be polyisobutylene particles partially melted during extrusion of the write-on film which then solidified at the lower melting point of the low density polyethylene film matrix. The rougher, more irregular particles observed in FIG. 21 and FIG. 22 are the SYLOID TM silica particles. FIG. 22 shows the ink edge running from about the middle of the left edge (at point A) to the middle of the bottom edge (at point A').

Figure 23:
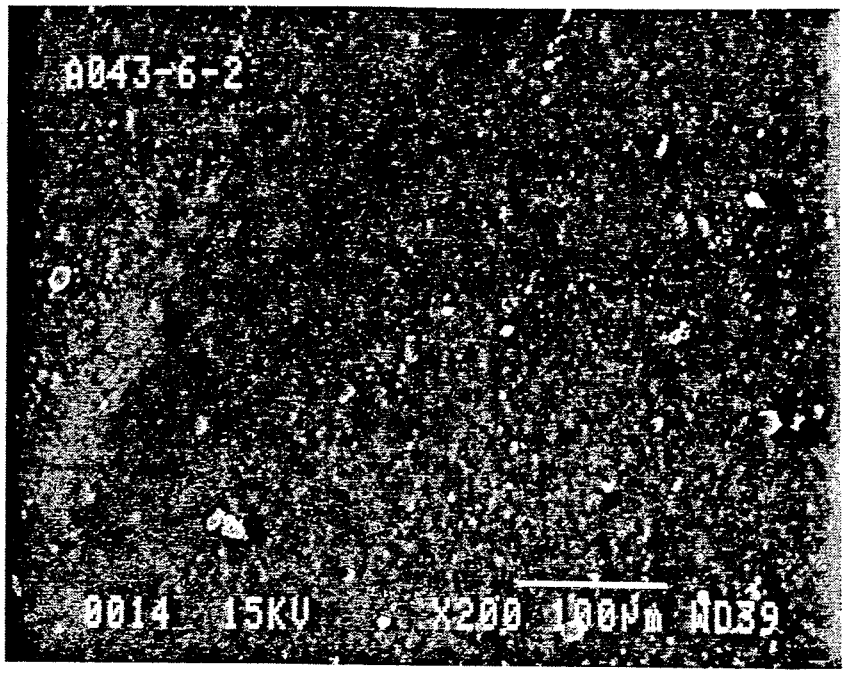
FIG. 23 is a 200× photomicrograph illustrating a film similar to that shown in FIG. 21 except that EXXELOR TM PA-30 was replaced with EXXELOR TM PA-50.
Figure 24:
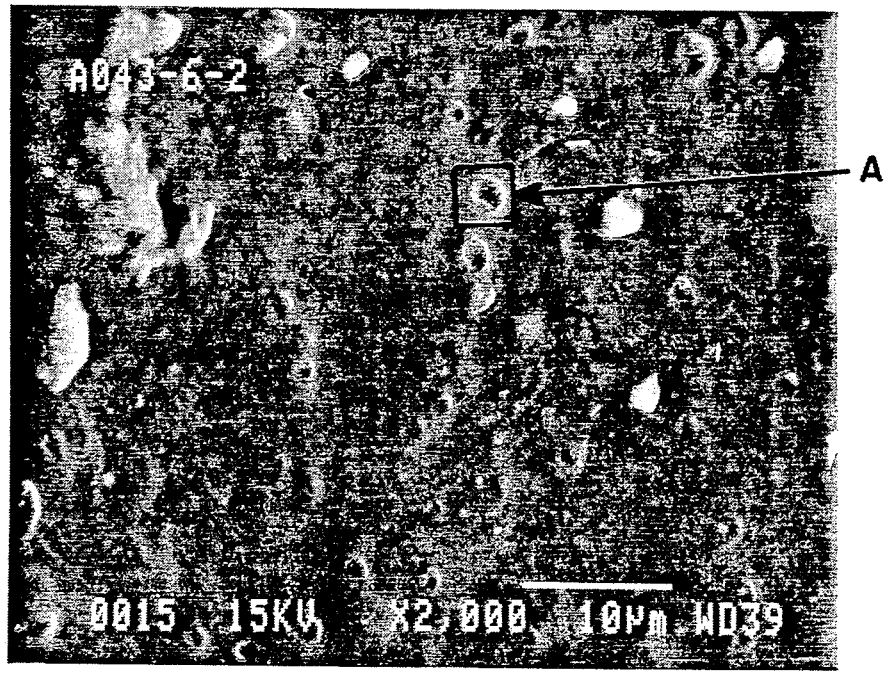
FIG. 24 is a 2000× photomicrograph illustrating a portion of the film surface depicted in FIG. 23.

EXAMPLE 12 (FIG. 23 and FIG. 24)

FIG. 23 and FIG. 24 show a sample which is the same as shown in FIG. 21 and FIG. 22, except the EXXELOR TM PA-30 component has been replaced with an equal amount of an EXXELORυ PA-50 component. Satisfactory write-on characteristics according to the instant invention are observed for the film sample of FIG. 23 and FIG. 24. FIG. 24 shows what appears to be "puckered" area at "A". It is believed that this "puckered" area is an area of polyisobutylene which when corona-discharge treated acts differently when provided in the different carrier polymer (high density polyethylene) of EXXELOR TM PA-50.

Figure 25:
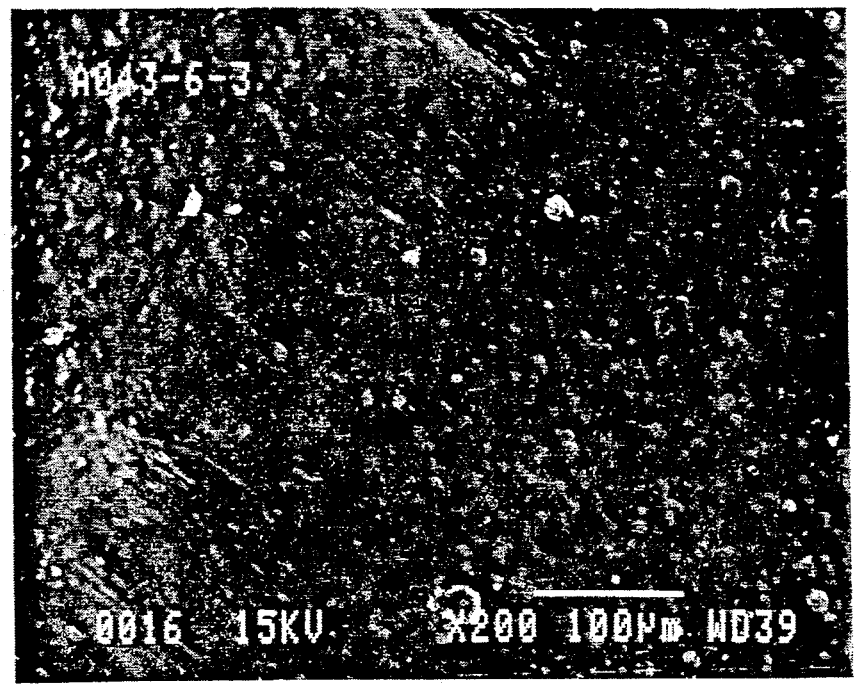
FIG. 25 is a 200× photomicrograph illustrating the film depicted in FIG. 21 after being aged at 140 degrees F. for 28 days.
Figure 26:
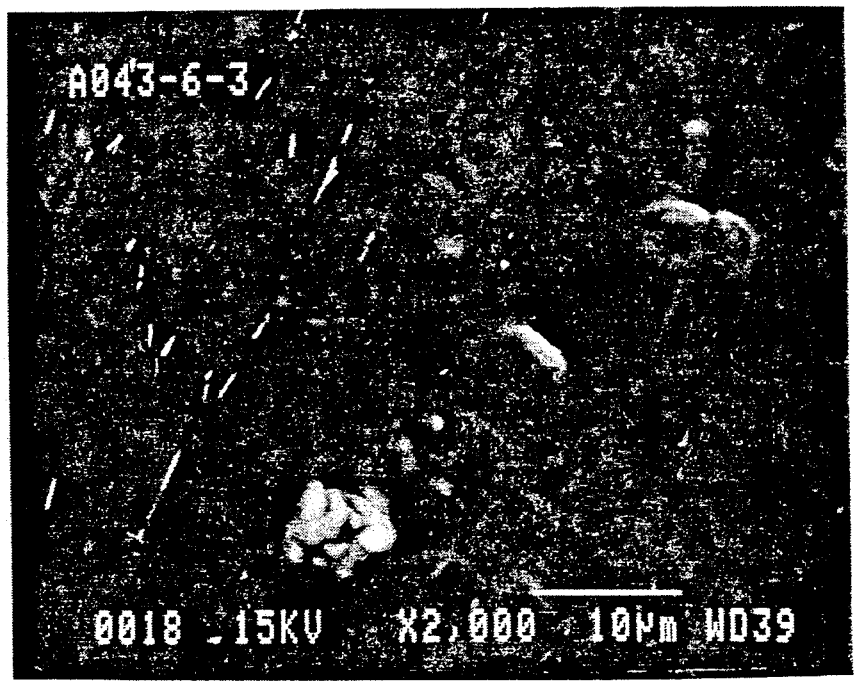
FIG. 26 is a 2000× photomicrograph illustrating a portion of the aged film of FIG. 25.

EXAMPLE 13 (FIG. 25 and FIG. 26)

FIG. 25 and FIG. 26 is a sample having the sample composition as that shown in FIG. 21, except the film sample has been oven aged at 140 degrees F. for four weeks. A high concentration of crystals is observed at the depression formed by the ballpoint of the ink pen. These crystals are identified as slip agent crystals which have bled (i.e., migrated) to the film surface through cracks formed by the ballpoint pen. It has been observed that when a ballpoint pen is drawn across the corona-discharge treated surface that the pressure exerted downward by the writing operation causes cracks in the brittle oxidized surface layer on the film formed as a result of the corona-discharge treatment. The slip agent is then free to "bleed" outwardly through the cracks as the ballpoint of the pen is drawn across the film surface.

Figure 27:
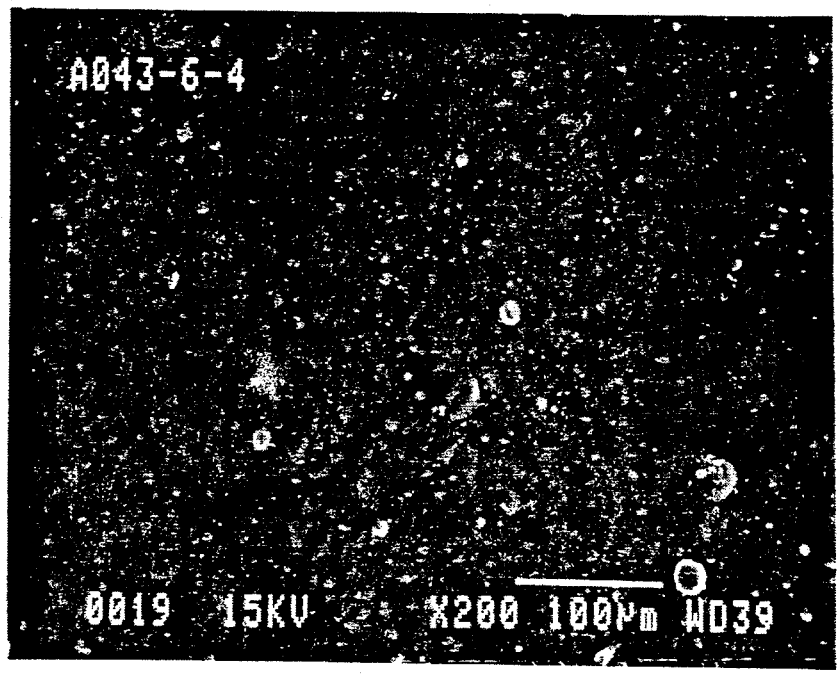
FIG. 27 is a 200× photomicrograph illustrating the film depicted in FIG. 23 after being aged at 140 degrees F. for 28 days.
Figure 28:
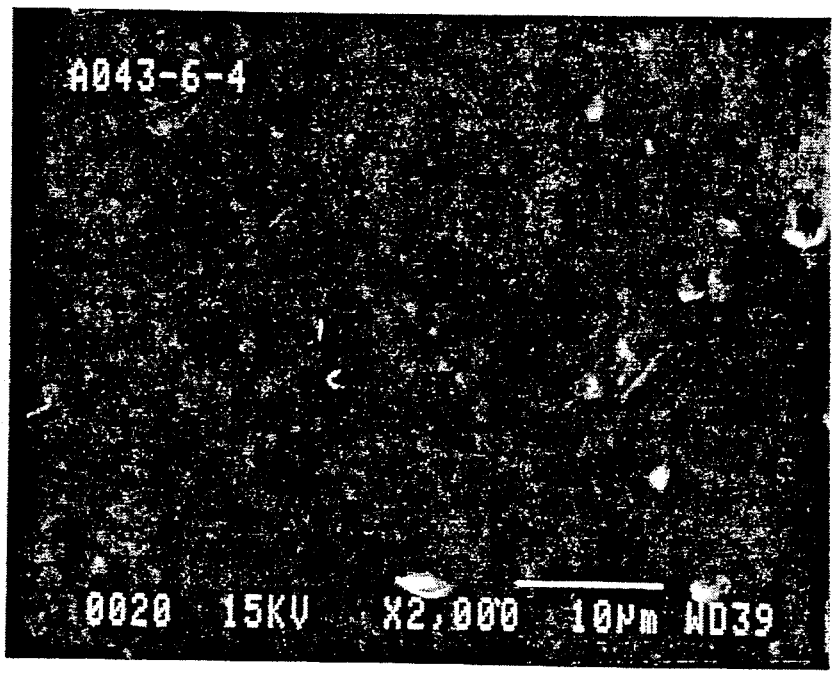
FIG. 28 is a 2000× photomicrograph illustrating a portion of the film surface depicted in FIG. 27.
Figure 29:
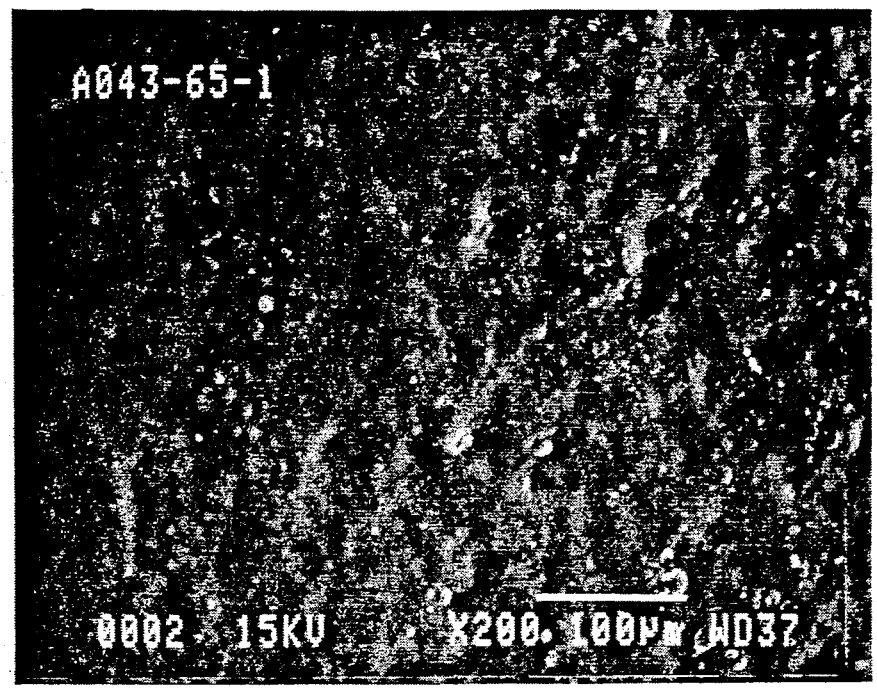
FIG. 29 is a 200× photomicrograph illustrating a portion of a low density polyethylene film surface containing a 10 wt. % of polyisobutylene component and 5 wt. % calcium carbonate component.
Figure 30:
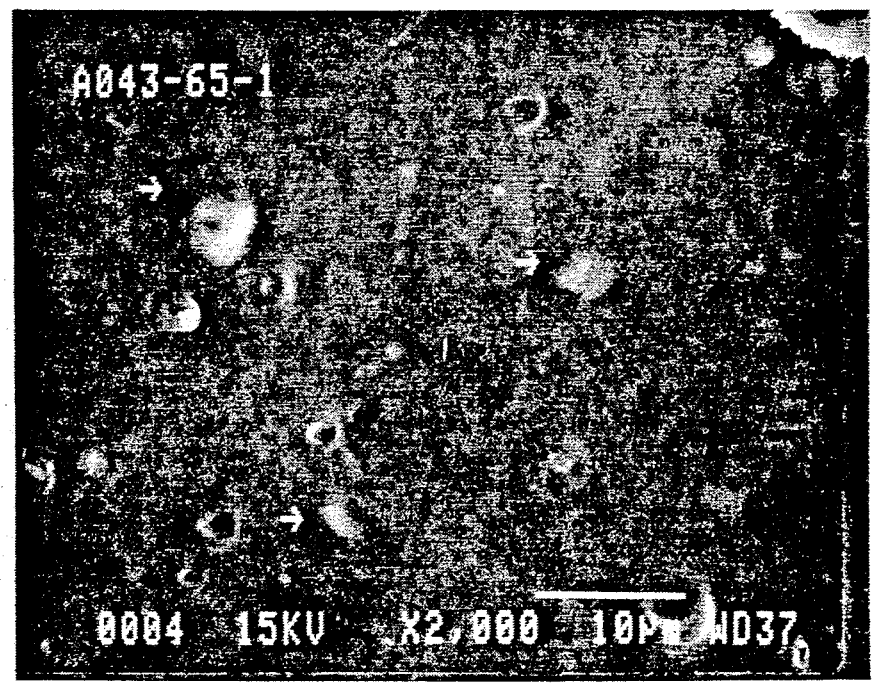
FIG. 30 is a 2000× photomicrograph illustrating a portion of the film surface of FIG. 29.
Figure 31:
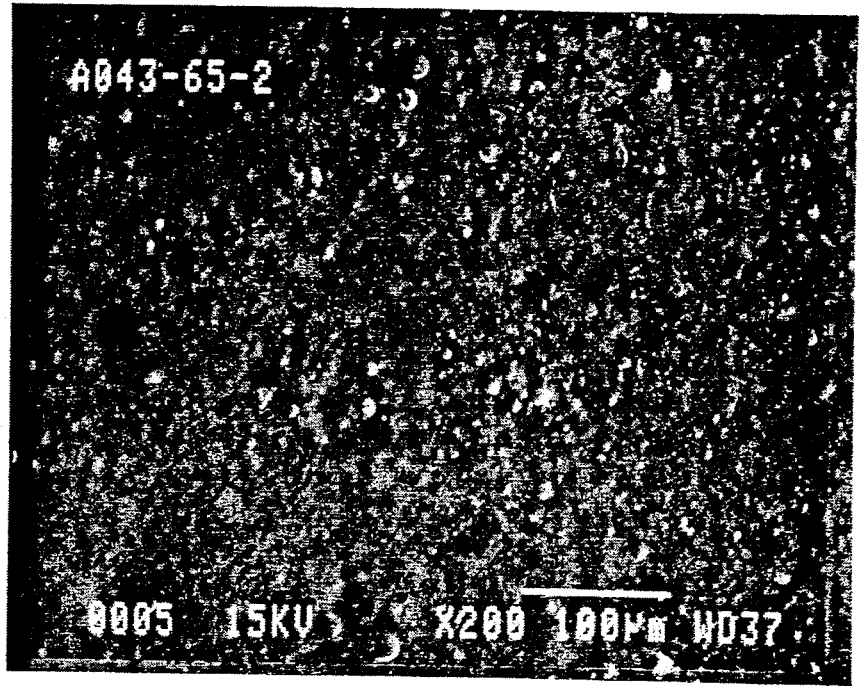
FIG. 31 is a 200× photomicrograph illustrating a portion of the film surface of a film similar to that shown in FIG. 29, except 20 wt. % of the polyisobutylene component was employed.
Figure 32:
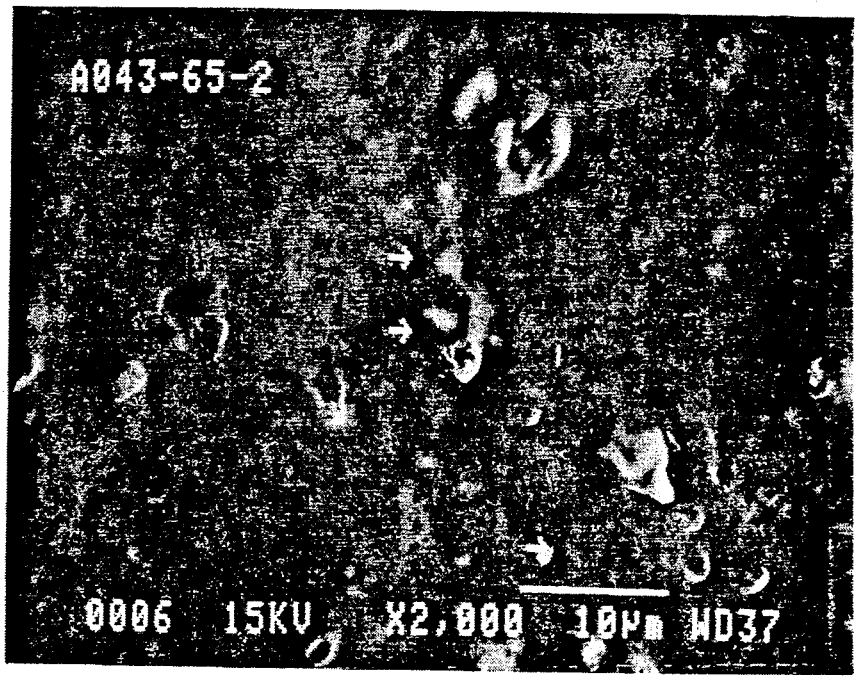
FIG. 32 is a 2000× photomicrograph illustrating a portion of the film surface of FIG. 31.
Figure 33:
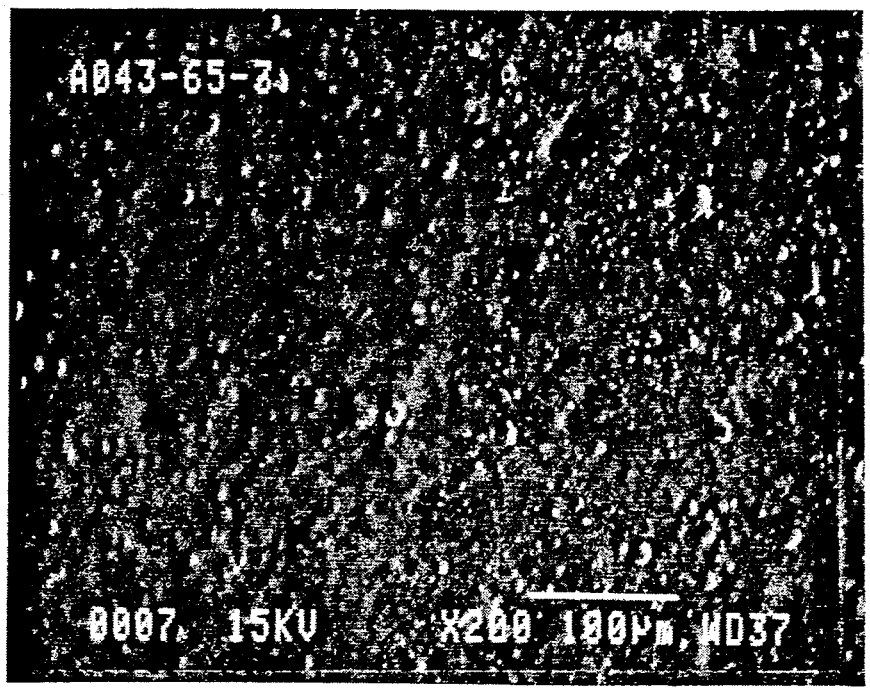
FIG. 33 is a 200× photomicrograph illustrating a portion of the film surface similar to that shown in FIG. 29, except 10 wt. % calcium carbonate was employed.
Figure 34:
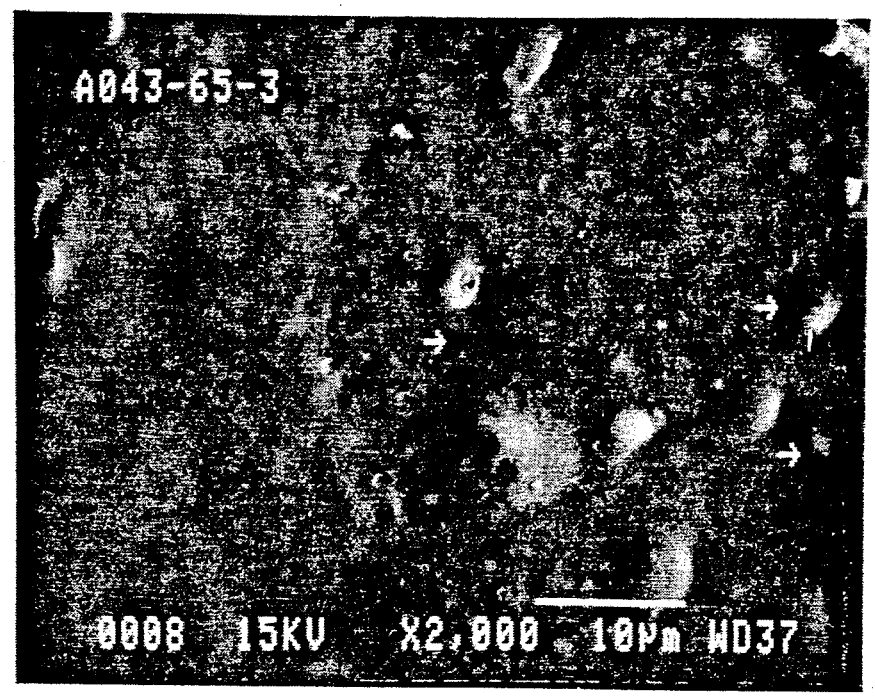
FIG. 34 is a 2000× photomicrograph illustrating a portion of the film surface of FIG. 33.
Figure 35:
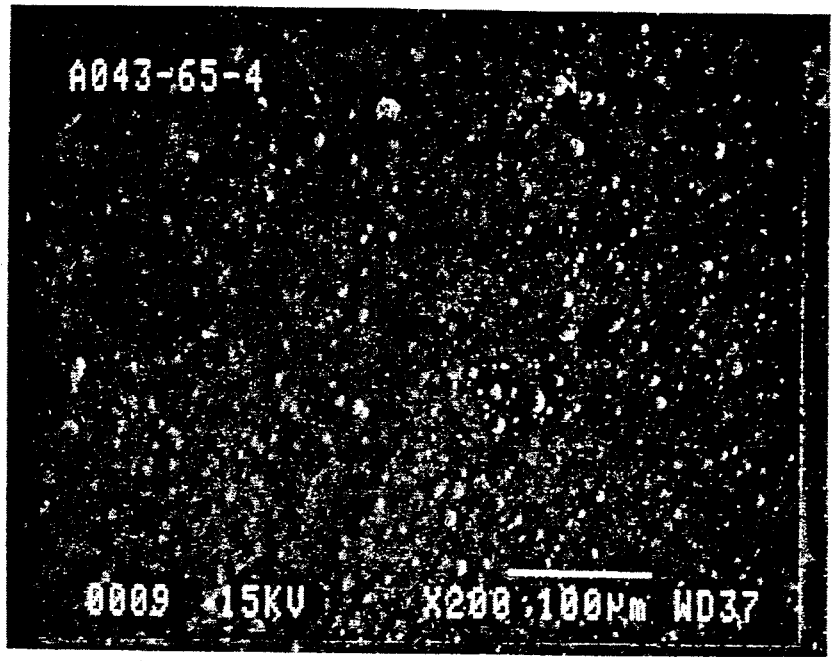
FIG. 35 is a 200× photomicrograph illustrating a portion of the film surface similar to that shown in FIG. 29, except 20 wt. % of a polyisobutylene component was employed and 20 wt. % calcium carbonate was employed.
Figure 36:
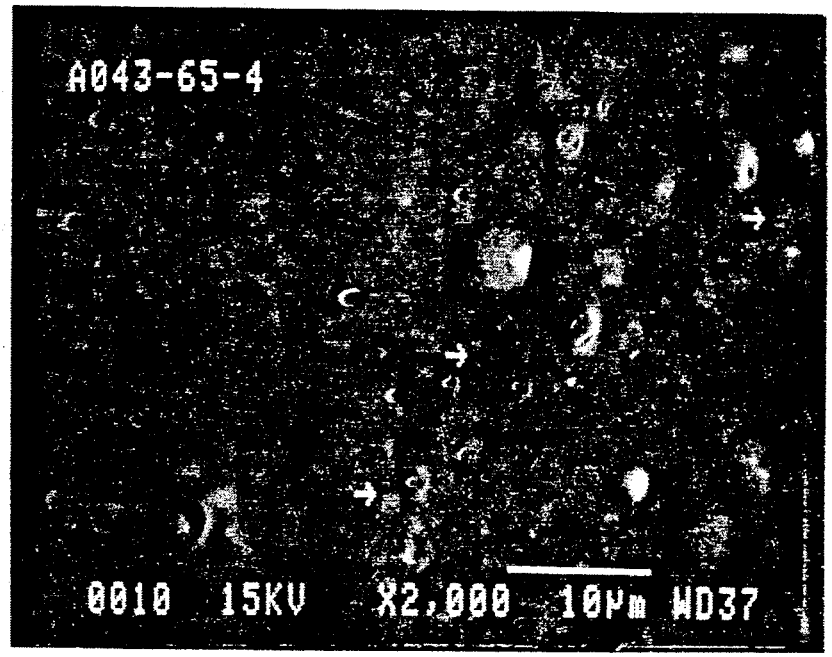
FIG. 36 is a 2000× photomicrograph illustrating a portion of the film surface of FIG. 35.

EXAMPLE 14 (FIG. 27 and FIG. 28)

FIG. 27 and FIG. 28 show the sample of FIG. 23 but having been oven aged at 140 degrees F. for about four weeks.

EXAMPLE 15 (FIG. 29 to FIG. 36)

The write-on film samples shown in FIGS. 29, 30, 31, 32, 33, 34, 35 and 36 were prepared using the hereinafter designated weight percents of EXXELOR TM PA-50, a calcium carbonate (OMYACARB® FT having a mean particle diameter of 1.8 microns) and a low density polyethylene resin which did not contain a slip agent component. A write-on film was coextruded with a bag film as described in the Experimental Procedure, above. The write-on film surface was corona-discharge treated at 95.7 watts/in$^2$. The following samples were prepared and evaluated:

| SAMPLE | EXXELOR TM PA-50 (conc) | CaCO$_3$ (conc) | Shown in FIGS. |
|---|---|---|---|
| 1 | 10 | 5 | 29 and 30 |
| 2 | 20 | 5 | 31 and 32 |
| 3 | 10 | 10 | 33 and 34 |
| 4 | 20 | 10 | 35 and 36 |

The samples were written upon with a medium point ballpoint pen and 200× and 2000× photomicrographs taken. Referring to FIGS. 29 to 36, the photomicrographs show irregularly-shaped particles which are identified as particles of calcium carbonate and more spherically-shaped particles which are identified as discrete particles of EXXELOR TM PA-50. Although the ink of the ballpoint pen is observed to wet the write-on film surface for each sample, the wetting observed for Sample 4 was judged to have been the best, based upon the ability of the ink to wet the write-on film surface. An increase in the concentration of the calcium carbonate component to about 25 wt. % is believed to be advantageous.

EXAMPLE 16

Samples of corona-discharge treated write-on film were made containing various amounts of EXXELOR ™ PA-50, $CaCO_3$ and/or SYLOID ™ silica, as set forth below, with the remainder comprising a low density polyethylene ("LDPE").

A paired comparison of the samples by five judges showed that when $CaCO_3$ was incorporated as a particulate material that the film sample containing EXXELOR ™ PA-50 and $CaCO_3$ was judged to improve the writability of the sample after aging (at a 90 percent confidence limit) over the other samples. The following film samples were prepared, embossed and corona-discharge treated according to the above-described Experimental

| SAMPLE[3] | Procedure: | | |
|---|---|---|---|
| | EXXELOR ™ PA-50 | $CaCO_3$[1] | SYLOID ™ Silica[2] |
| 1 | 10 | 10 | 0 |
| 2 | 20 | 10 | 0 |
| 3 | 10 | 20 | 0 |
| 4 | 20 | 20 | 0 |
| 5 | 20 | 0 | 20 |

[1]Added as 50 wt. % $CaCO_3$ in a low density polyethylene.
[2]Added as 50 wt. % silica in a low density polyethylene.
[3]Corona-discharge treated at 95.8 watts/in$^2$.

I claim:

1. A bag comprising a slip agent containing an extruded bag film for forming a bag body and an extruded write-on film bonded to said bag film wherein said write-on film surface comprises a surface treated write-on film wherein the write-on film comprises a physical mixture, without slip agent, of two substantially incompatible polymers, wherein a second polymer is substantially incompatible in a first polymer and wherein said write-on film is extruded and has a surface which is corona-discharge treated and wherein: (1) said bag film is an extruded polyethylene having a density between about 0.915 and about 0.930 grams per cubic centimeter containing between about 500 ppm and about 2500 ppm of a said slip agent; and (2) said extruded write-on film comprises a major amount of at lest one polymer selected from the group consisting of low density polyethylene, high density polyethylene and polypropylene, and a minor amount of at least one polymer or polymeric mixture selected from the group consisting of (1) polyisobutylene, (2) a mixture of polyisobutylene and polypropylene and (3) a mixture of polyisobutylene and high density polyethylene with the proviso that said write-on film as formed is substantially without slip agent and containing between about 3.0 wt. % and about 20 wt. % of a particulate material based on the total weight of the write-on composition.

2. A bag according to claim 1 wherein said bag film is a low density polyethylene film and said write-on film surface comprises low density polyethylene as said first polymer and polyisobutylene as said second polymer.

3. A bag according to claim 1 wherein said bag film is a low density polyethylene film and said write-on film comprises polypropylene as said first polymer and polyisobutylene as said second polymer.

4. A bag according to claim 1 wherein the weight ratio of said first polymer to said second polymer is between about 10:1 and about 1:10.

5. A bag according to claim 4 wherein the ratio of the thickness of said bag film to the thickness of said contacting write-on film is between about 1:2 and about 1:10.

6. A bag according to claim 1 wherein the slip agent in said bag film is a $C_{18}$ to $C_{22}$ fatty acid amide and is present in an amount between about 500 ppm and about 2500 ppm.

7. A bag according to claim 6 wherein the slip agent is present in an amount between about 1000 ppm and about 2000 ppm.

8. A bag according to claim 1 wherein said write-on film is embossed.

9. A bag according to claim 1 wherein said particulate material is at lest one particulate material selected form the group consisting of silica titanium dioxide, starch and mixtures thereof.

10. A bag according to claim 9 wherein said silica is a silica having a surface are of about 350 m$^2$/g, an average particle size of about 3.0 microns and a density of about 8 lbs/ft$^3$.

11. A bag according to claim 1 wherein the thickness of the write-on film is greater than about 30 percent of the total thickness of the combined thickness of the write-on film and bag film where said write-on film contacts said bag film.

12. A bag according to claim 1 wherein said bag film comprises a low density polyethylene containing between about 500 ppm and about 2500 ppm ecuramide as said slip agent and said write-on film is a mixture of a minor amount of polyisobutylene and a major amount of at lest one polymer selected from the group consisting of low density polyethylene, high density polyethylene and polypropylene.

13. A bag according to claim 9 wherein said slip agent is ecuramide present in an amount between about 1000 ppm and about 500 ppm and said particulate material is a mixture of a titanium dioxide and a silica present in an amount between about 3.0 wt. % and about 20 wt. % based on the total weight of the write-on composition.

14. A bag according to claim 1 wherein said write-on film surface is corona-discharge treated at between about 50 watts/in$^2$ and about 150 watts/in$^2$.

15. A bag according to claim 1 comprising a corona-discharge treated write-on film in contact with said bag film wherein the write-on film has a thickness of about 2.1 mils and said contacting bag film has a thickness of about 0.7 mil.

16. A bag according to claim 15 wherein the write-on film and bag film are formed by coextrusion.

17. A bag according to claim 1 wherein said write-on film may contain at least one polymer selected from the group consisting of polyvinyl alcohol or butadiene/styrene.

* * * * *